(12) United States Patent
McClellan et al.

(10) Patent No.: US 12,085,668 B2
(45) Date of Patent: Sep. 10, 2024

(54) RADAR CLOAKING APPARATUS AND METHODS OF USE

(71) Applicant: nou Systems, Inc., Huntsville, AL (US)

(72) Inventors: Glen Patrick McClellan, Madison, AL (US); Joshua Lee Wilson, Huntsville, AL (US)

(73) Assignee: nou Systems, Inc., Huntsville, AL (US)

( * ) Notice: Subject to any disclaimer, the term of this patent is extended or adjusted under 35 U.S.C. 154(b) by 0 days.

(21) Appl. No.: 18/461,813

(22) Filed: Sep. 6, 2023

(65) Prior Publication Data

US 2023/0408641 A1 Dec. 21, 2023

Related U.S. Application Data

(63) Continuation of application No. 17/197,938, filed on Mar. 10, 2021, now Pat. No. 11,789,115.

(51) Int. Cl.
*G01S 7/38* (2006.01)

(52) U.S. Cl.
CPC ..................... *G01S 7/38* (2013.01)

(58) Field of Classification Search
CPC ....................................................... G01S 7/38
See application file for complete search history.

(56) References Cited

U.S. PATENT DOCUMENTS 3,430,156 A * 2/1969 Martin .................... G01S 7/025
330/10

5,150,122 A 9/1992 Bell
2005/0001754 A1 * 1/2005 Sparrow ................. G01S 7/282
342/13
2019/0086549 A1 3/2019 Ushani et al.
(Continued)

FOREIGN PATENT DOCUMENTS

EP 3339884 A1 6/2018

OTHER PUBLICATIONS

Ann Marie Aull et al., "Real-Time Radar Image Understanding: A Machine-Intelligence Approach," The Lincoln Laboratory Journal, vol. 6, No. 2, pp. 195-222, (1992).
(Continued)

*Primary Examiner* — Bernarr E Gregory
*Assistant Examiner* — Hailey R Le
(74) *Attorney, Agent, or Firm* — Alston & Bird LLP

(57) ABSTRACT

A radar cloaking apparatus configured for positioning on a radar target and corresponding methods are provided. The radar cloaking apparatus comprises a radio signal emitter and computational circuitry. The computational circuitry is configured to cause the radar cloaking apparatus to at least reference a model encoding scattering properties of the radar target; determine a predicted reflection signature of the radar target from a selected interrogation angle based at least in part on the model encoding the scattering properties of the radar target; and cause transmission, by the radio signal emitter, of a cloaking radio signal along the selected interrogation angle. The cloaking radio signal is actively generated based on the predicted reflection signature of the radar target shifted in phase such that the cloaking radio signal is configured to destructively interfere with a reflected signal formed by an interrogating radar signal scattering off of the radar target.

20 Claims, 14 Drawing Sheets

(56) References Cited

U.S. PATENT DOCUMENTS

| | | |
|---|---|---|
| 2019/0187245 A1 | 6/2019 | Guarin et al. |
| 2019/0392275 A1 | 12/2019 | Filonov et al. |
| 2020/0072764 A1* | 3/2020 | Vacanti .................. G01N 22/00 |
| 2020/0366402 A1 | 11/2020 | Dunn |
| 2023/0204716 A1* | 6/2023 | Ginzburg .................. G01S 7/38 342/14 |

OTHER PUBLICATIONS

Bai Yang et al., "Active Cancellation Stealth Technology Analysis and Verification in Experiment," Procedia Computer Science, vol. 147, pp. 109-115, (2019).

Evan J. Hughes et al. "Using Multiple Genetic Algorithms to Generate Radar Point-Scatterer Models," IEEE Transactions on Evolutionary Computation, vol. 4, No. 2, 14 pages, (Jul. 2000).

Junichi Honda et al., "Rapid Ray Tracing Analysis of Scattered Field from an Aircraft Model in Super Wide Area," 2013 Eighth International Conference on Broadband, Wireless Computing, Communication and Applications, Compiegne, France, pp. 177-183, (2013).

Mingxu Yi et al., "Active cancellation analysis based on the radar detection probability," Aerospace Science and Technology, vol. 46, pp. 273-281, (2015).

S. H. Park et al., "Stepped-Frequency ISAR Motion Compensation Using Particle Swarm Optimization With an Island Model," Progress in Electromagnetics Research (PIER), vol. 85, pp. 25-37, (Sep. 13, 2008).

Sheng Yu et al., "Research on active cancellation stealth technique," Optik, vol. 125, pp. 6219-6222, (Sep. 16, 2014).

X. Sheng et al., "Assemble an Active Cancellation Stealth System," Microwaves & RF, vol. 51, No. 7, 6 pages, (2012).

Zhou Jianxiong et al., "Extracting Global 3D Scattering Center Model of Radar Target from Multiple HRR Profiles," 2007 IEEE Radar Conference, pp. 811-816, (2007).

U.S. Appl. No. 17/197,938, filed Mar. 10, 2021, U.S. Pat. No. 11,789,115, Patented.

* cited by examiner

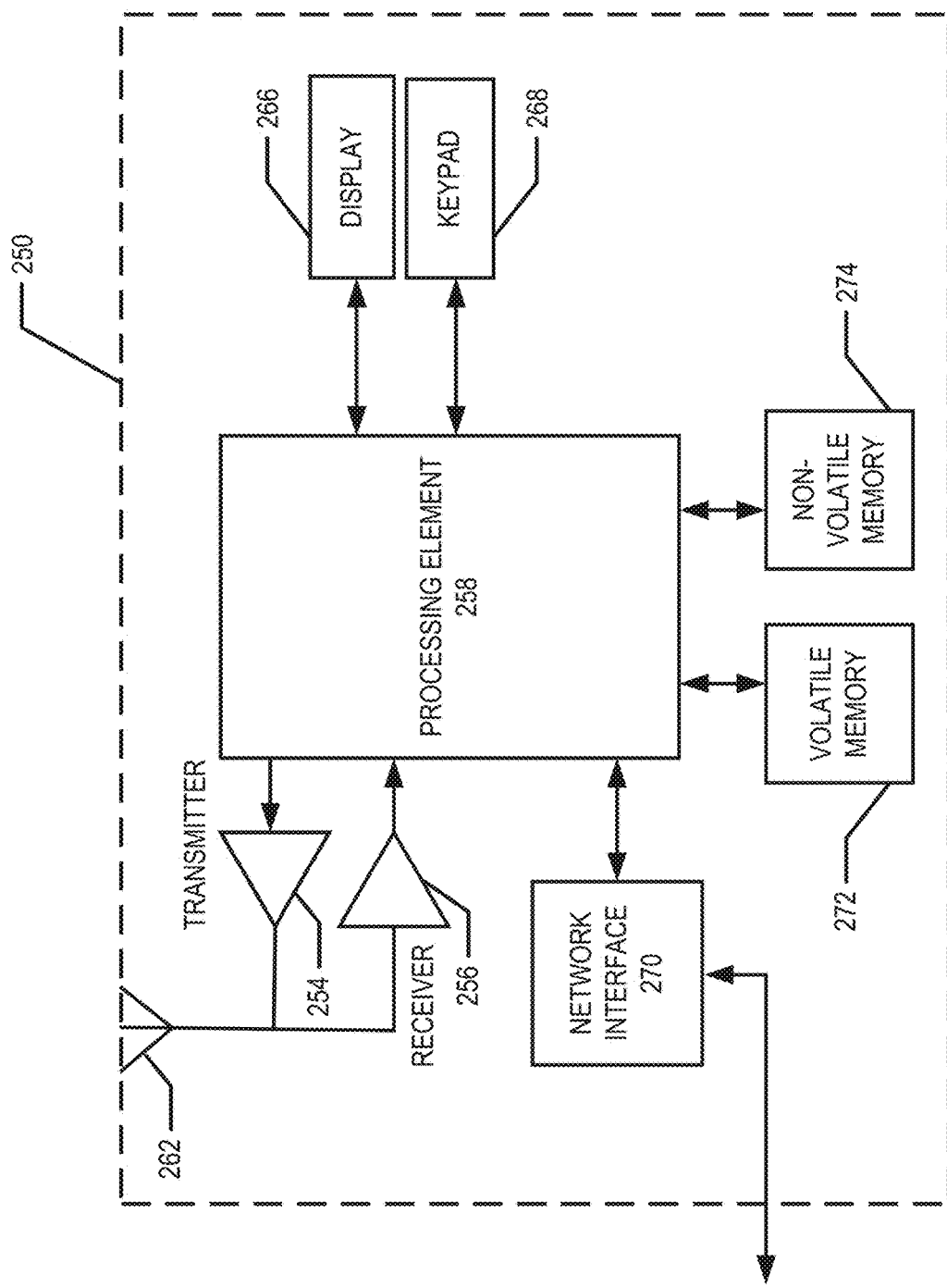

RADAR CLOAKING APPARATUS AND METHODS OF USE

CROSS-REFERENCE TO RELATED APPLICATIONS

This application claims priority to U.S. application Ser. No. 17/197,938, filed Mar. 10, 2021, the content of which is incorporated herein by reference in its entirety.

FIELD

Various embodiments described herein relate to an active radar cloaking apparatus. Various embodiments relate to a radar cloaking apparatus configured to emit, transmit, and/or broadcast a cloaking radio signal and methods associated therewith.

BACKGROUND

Radar technology enables the identification of objects at a distance, sometimes even when the object is hidden from view (e.g., by clouds, vegetation, and/or the like). However, it may be desired for a particular object to be able to travel through an area being monitored via radar without being detected. Conventional methods of radar cloaking and/or attempting to make an object less detectable by radar tend to focus on passive radar cloaking such as forming an object with a geometry and surface materials and/or finishes that reduce the power of an interrogating radar signal that is reflected and/or scattered off the object back toward an interrogating radar system.

BRIEF SUMMARY

Various embodiments described herein relate to an active radar cloaking apparatus. The radar cloaking apparatus is configured to generate, transmit, broadcast, and/or emit a cloaking radio signal configured to destructively interfere with a reflected signal generated by an interrogating radar signal scattering and/or reflecting off of a radar target to which the radar cloaking apparatus is physically associated and/or coupled. In various embodiments, the cloaking radio signal is generated at least in part based on a model configured and/or generated to encode the scattering properties of the radar target to which the radar cloaking apparatus is and/or is intended to be physically associated and/or coupled.

The radar cloaking apparatus may be configured to receive (e.g., via a receiving antenna) an interrogating radar signal that is incident on the radar target to which the radar cloaking apparatus is and/or is intended to be physically associated and/or coupled. An electrical signal may be generated by the receiving antenna responsive to the interrogating radar signal being incident thereon. The electrical signal may be conditioned based on the model encoding scattering properties of the radar target. The conditioned electrical signal may then be provided to an emitting antenna such that the emitting antenna generates, transmits, broadcasts, and/or emits a cloaking radio signal.

The cloaking radio signal is configured to approximate the reflected signal generated by the interrogating radar signal scattering and/or reflecting off of the radar target and is configured to be shifted in phase (e.g., by 120-240 degrees) with respect to the reflected signal. For example, a predicted reflection signature configured to approximate the reflected signal may be determined based on the model encoding scattering properties of the radar target and the cloaking radio signal may be generated based at least in part on the predicted reflection signature. In various embodiments, the cloaking radio signal destructively interferes with the reflected signal such that the reflected signal observed by the radar system that transmitted and/or broadcasted the interrogating radar signal is reduced and/or minimized. For example, the reflected signal observed by the radar system may be rendered below the detection threshold of the radar system due to the destructive interference of the cloaking radio signal interacting with the reflected signal.

In an example embodiment, the model configured to encode scattering properties of the radar target is a model trained to define a scattering element representation of the radar target and/or the scattering properties thereof. For example, the scattering properties of the radar target may be approximated by defining a plurality of scattering elements that each approximate the scattering properties of a scattering feature of the radar target. In such an embodiment, a predicted reflection signature is generated for each scattering element that approximates the reflected signal generated by the interrogating radar signal scattering and/or reflecting off the corresponding scattering feature of the radar target.

An aggregated predicted reflection signature may be generated by aggregating, combining, superpositioning, and/or adding each of the predicted reflection signatures together. The cloaking radio signal may then be generated based on the aggregated predicted reflection signature. For example, the cloaking radio signal may be generated by conditioning an electrical signal generated by an interrogating radar signal being incident on a receiving antenna of the radar cloaking apparatus based at least in part on the aggregated predicted reflection signature. The conditioned electrical signal may then be provided to an emitting antenna of the radar cloaking apparatus to cause the cloaking radio signal to be generated, transmitted, broadcasted, and/or emitted.

According to an aspect of the present disclosure, a radar cloaking apparatus configured for positioning on a radar target defining one or more scattering features is provided. In an example embodiment, the radar cloaking apparatus comprises a radio signal emitter and computational circuitry. The computational circuitry is configured to cause the radar cloaking apparatus to at least reference a model encoding scattering properties of the radar target; determine a predicted reflection signature of the radar target from a selected viewing angle based at least in part on the model encoding the scattering properties of the radar target; and cause transmission, by the radio signal emitter, of a cloaking radio signal along the selected interrogation angle. The cloaking radio signal is actively generated based on the predicted reflection signature of the radar target shifted in phase such that the cloaking radio signal is configured to destructively interfere with a reflected signal formed by an interrogating radar signal scattering off of the radar target.

According to another aspect of the present disclosure, a method for transmitting a cloaking radio signal is provided. In an example embodiment, the method comprises referencing a model encoding scattering properties of a radar target by computational circuitry of a radar cloaking apparatus. The radar cloaking apparatus is configured to be physically associated with the radar target. The method further comprises, determining, by the computational circuitry, a predicted reflection signature of the radar target from a selected interrogation angle based at least in part on the model encoding the scattering properties of the radar target; and causing transmission, by a radio signal emitter of the radar cloaking apparatus, of a cloaking radio signal along the selected interrogation angle. The cloaking radio signal is actively generated based on the predicted reflection signature of the radar target shifted in phase such that the cloaking radio signal is configured to destructively interfere with a reflected signal formed by an interrogating radar signal scattering off of the radar target.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2C is a block diagram illustrating components of an example user device, in accordance with an example embodiment;

Figure 8:
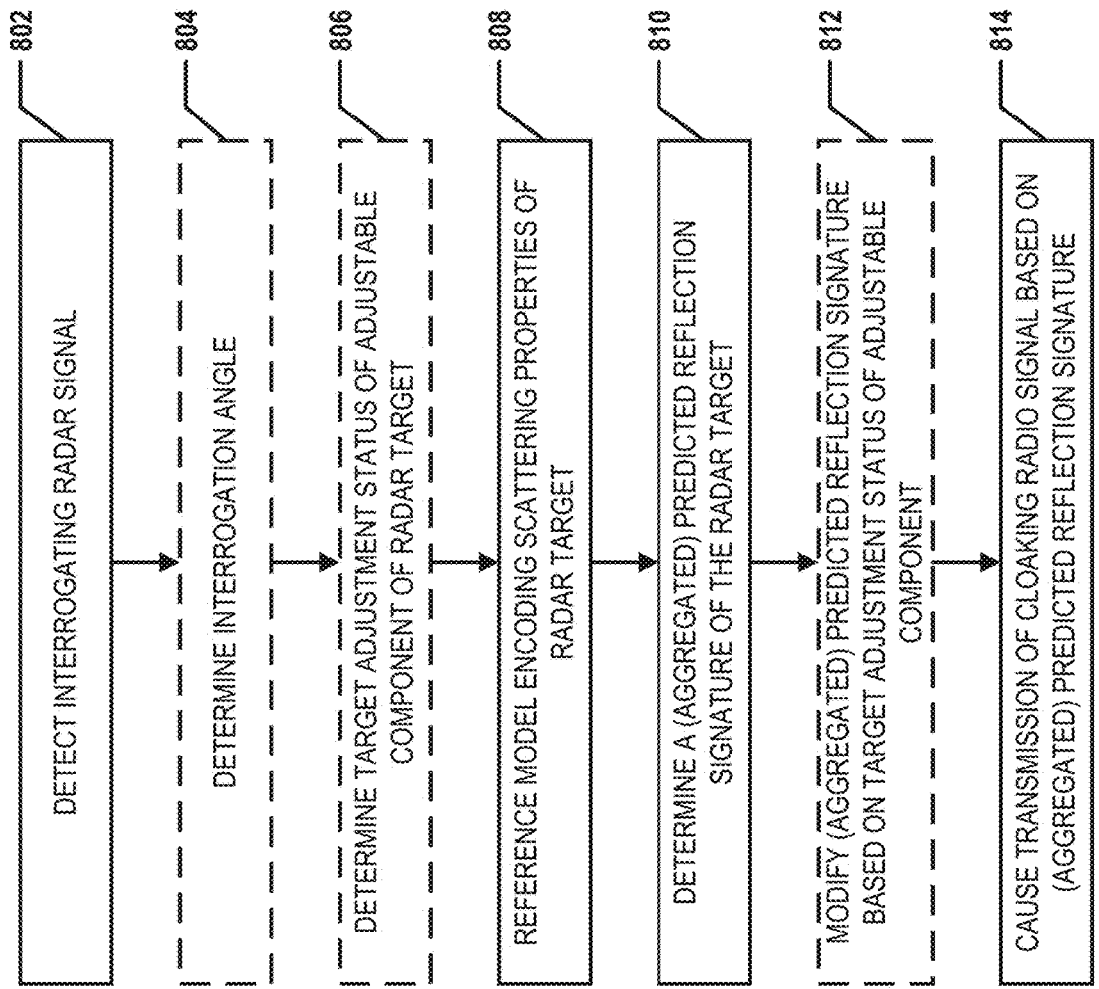
Figure 9:
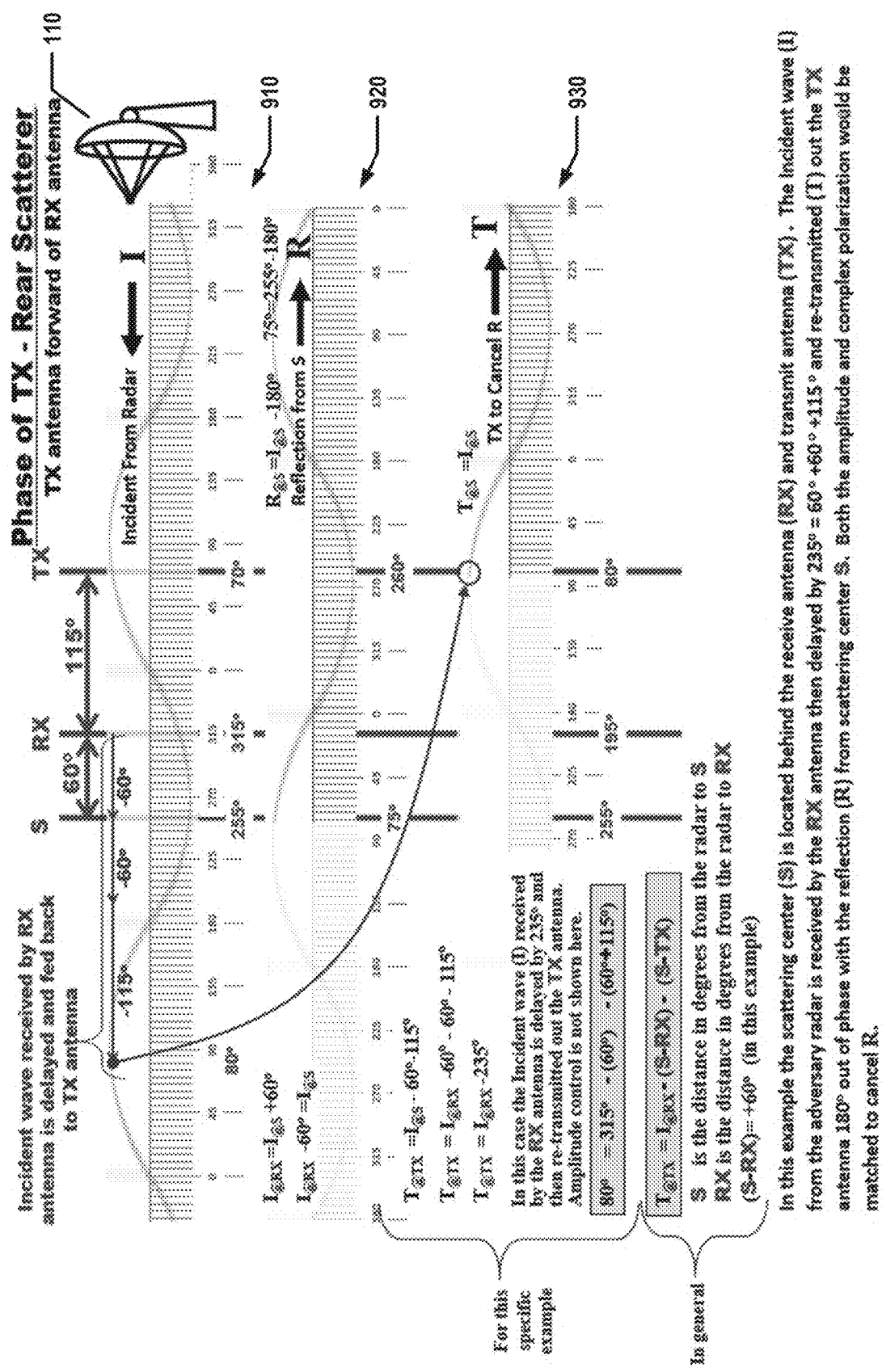
Figure 10:
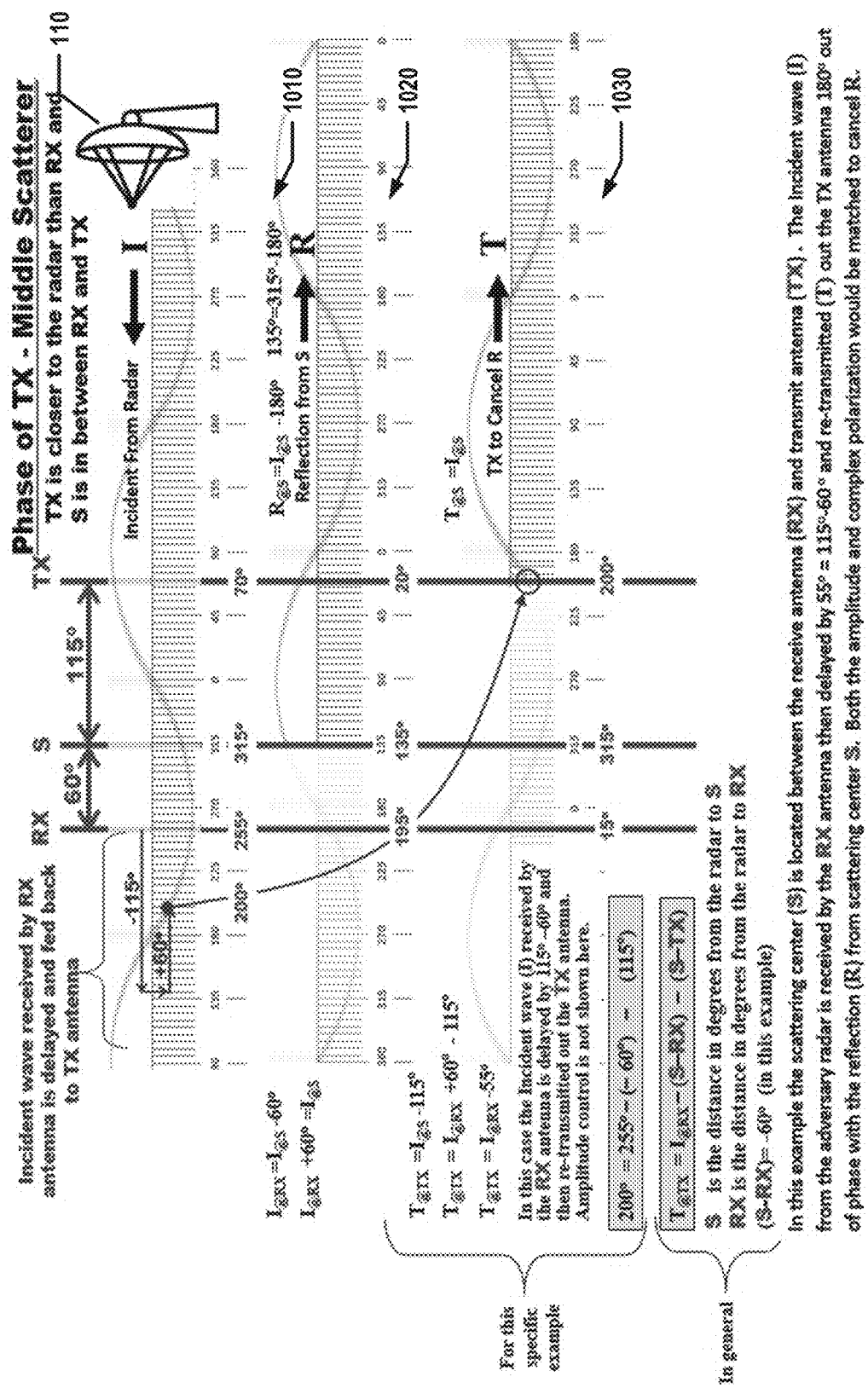
Figure 11:
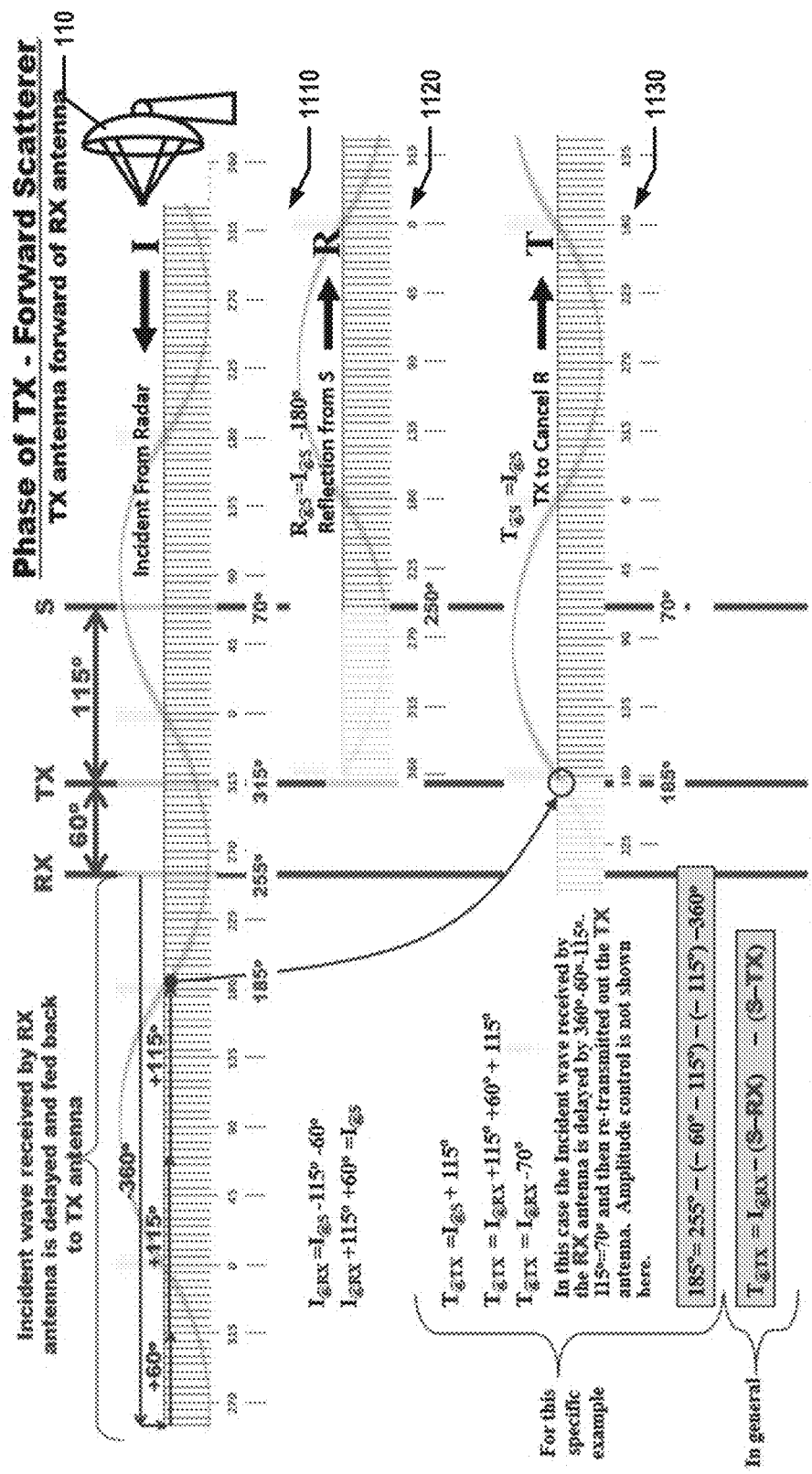

FIG. 8 is a flowchart illustrating processes, steps, procedures, and/or operations performed by the computational circuitry of a radar cloaking apparatus, for example, to generated, transmit, broadcast, and/or emit a cloaking radio signal, in accordance with an example embodiment; and FIGS. 9-11 illustrate a delay associated with a scattering feature for three different locations of the scattering feature with respect to the receiving and emitting antennas of the radar cloaking apparatus, in accordance with an example embodiment.

DEFINITIONS

Certain terms used in connection with exemplary embodiments are defined below.

The term "radar cloaking apparatus" refers to hardware or hardware and software that is configured to detect an interrogating signal, determine a predicted reflection signature, and cause transmission of a cloaking signal based on the predicted reflection signature. In various embodiments, a radar cloaking apparatus may be secured to a radar target. For example, the radar cloaking apparatus may be physically associated with an object (e.g., aircraft, manned or unmanned aerial vehicle, manned or unmanned ground vehicle, boat, submarine, and/or the like).

The term "scattering element" refers to a portion of a model encoding scattering properties of a radar target. The scattering element is defined by a set of parameters and corresponds to a scattering feature of the radar target. A scattering element is represented within the model encoding scattering properties of the radar target as a point scatterer defined by a plurality of parameters. The parameters are determined based on the scattering properties of the corresponding scattering feature of the radar target. For example, the parameters may indicate a location of the corresponding scattering feature on the radar target, geometric information regarding the corresponding scattering feature, a reflection coefficient and/or reflection amplitude information for the corresponding scattering feature, and/or other characteristics that affect the scattering properties of the corresponding scattering feature.

The term "computational circuitry" refers to circuitry configured to perform computational functions. For example, the computational circuitry may be a circuit hardwired to perform one or more functions. For example, the computational circuitry may comprise amplifiers (e.g., low noise amplifiers (LNAs)), frequency phase detectors, filters (e.g., low pass filters (LPFs), high pass filters (HPFs), band filters, and/or the like), delay lines, multiplexers and/or combiners, demultiplexers and/or splitters, phase locked loops, waveform generators (e.g., arbitrary waveform generator (AWG), direct digital synthesis (DDS), and/or the like), voltage detectors, and/or the like. In another example, the computational circuitry may comprise one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. In an example embodiment, the computational circuitry may further comprise non-transitory memory configured to store computer-executable instructions that may be executed and/or processed by one or more portions of the computational circuitry to cause the computational circuitry to perform particular functions.

The term "model encoding scattering properties of the radar target" refers to a model of the radar scattering properties of a radar target. In various embodiments, the model encoding scattering properties of the radar target is a model trained to define a scattering element representation of the radar target. In such embodiments, the model encoding scattering properties of the radar target interprets the radar target as having a plurality of scattering features and the model encoding scattering properties of the radar target comprises a plurality of scattering elements that each model and/or parameterize the radar scattering properties of one of the scattering features. At least a portion of the model encoding scattering properties of the radar target is empirically determined (e.g., determined based on empirical data). The model encoding scattering properties of the radar target may take the form of a collection of scattering elements, each defined by a set of parameters, or a look up table. For example, such a look up table may include a predicted reflection signature for each scattering element from one or more interrogation angles and one or more roll and/or pitch angles.

The term "scattering element representation" refers to a representation of a radar target defined by the plurality of scattering elements of the model encoding scattering properties of the radar target and its various radar scattering features. As each scattering element corresponds to a scattering feature of the radar target, when taken as a collection, the plurality of scattering elements provide a representation of the radar scattering properties of the radar target as a whole.

The term "predicted reflection signature" refers to a predicted spectral response of an interrogating signal scattering and/or reflecting off of a radar target and/or a scattering feature of the radar target from an interrogation angle for a roll and/or pitch angle of the radar target. In some embodiments, the predicted reflection signature is determined at least in part based on the model encoding the scattering properties of the radar target.

When the model encoding scattering properties of the radar target is a model trained to define a scattering element representation of the radar target, a predicted reflection signature may be determined for one or more scattering elements of the scattering element representation and the one or more predicted reflection signatures may be aggregated to form an aggregated predicted reflection signature for the radar target. The aggregated predicted reflection signature is generated by spatially and temporally combining the predicted reflection signature for each of the scattering elements of the scattering element representation for the interrogation angle for a roll and/or pitch angle of the radar target. For example, scattering theory may be used to determine a predicted reflection signature for each scattering element of the scattering element representation. The predicted reflection signatures for the scattering elements may then be combined based on the spatial relationships between the corresponding scattering features defined by the body of the radar target and the time and/or phase delays corresponding to the spatial relationships between the corresponding scattering features of the radar target and the interrogation angle to generate an aggregated predicted reflection signature for a roll and/or pitch angle for the radar target.

The term "interrogation angle" refers to the angle of incidence of the interrogating signal with respect to the radar target. FIG. 1 illustrates the interrogation angle α of the interrogation signal 120 incident on the radar target 10, where the interrogation angle α is the angle between an interrogator direction 20 and a reference direction 25.

The term "roll angle" refers to the angle of a reference position of the radar target (e.g., a reference position on a surface of the radar target) with respect to a roll axis of the radar target. Shown in FIG. 1, in the illustrated embodiment, the roll axis 27 is substantially parallel to a longitudinal axis of the radar target. For example, the roll axis 27 may be substantially parallel to the velocity vector for the radar target when the radar target is in forward motion. The roll angle φ is the angle about the roll axis 27 between a reference position of the radar target and a reference direction. For example, in a situation where the radar target comprises wings, the reference position may be a line defined by a first wing of the radar target, the reference direction may be the first wing being horizontal and/or substantially parallel to the ground, and the roll angle φ is the angle between the line defined by the first wing and the horizontal.

The term "pitch angle" refers to the angle γ between the roll axis 27 and/or the longitudinal axis of the radar target and a horizontal plane 29, as shown in FIG. 1.

The term "viewing angle" refers to the orientation of the radar target from the perspective of the interrogating radar signal. In various embodiments, the viewing angle is determined based on and/or defined by the interrogation angle and the roll and/or pitch angle of the radar target.

The term "cloaking radio signal" refers to a radio frequency signal that is designed to, through destructive interference with the reflected signal (e.g., the reflection of an interrogating radar signal that has scattered and/or reflected off of the radar target) cause the reflected signal to be difficult to observe. Generally, a cloaking radio signal is at least similar to the reflected signal of a corresponding radar target but shifted in phase in a range of 120-240 degrees (e.g., by approximately 180 degrees) with the reflected signal such that the combination of the cloaking radio signal and the reflected signal has a near zero amplitude. For example, the amplitude of the combination of the cloaking radio signal and the reflected signal is configured to be below the detection threshold of one or more radar systems, in an example embodiment. The cloaking radio signal is generated and/or transmitted by a radar cloaking apparatus (e.g., a transmission or emitting antenna of a radar cloaking apparatus). The cloaking radio signal is configured to be received by a radar system along with a reflected signal. The cloaking radio signal is configured to, through destructive interference, cancel out the reflected signal such that a radar system receiving the reflected signal and the cloaking radio signal will observe a signal having a near zero amplitude and/or that is below the detection threshold of the radar system.

The term "shifted in phase" refers to the shifting of the phase of an electromagnetic wave or signal (e.g., a radio frequency signal). In general, the amplitude of an electromagnetic wave or signal may be described as $f(x, t) = A \sin(kx - \omega t + \Phi)$, where k is the wave number of the electromagnetic wave or signal, $\omega$ is the frequency of the electromagnetic wave or signal, and $\Phi$ is the initial phase of the electromagnetic wave or signal. The value $kx - \omega t + \Phi$ is the phase of the electromagnetic wave or signal. Shifting the phase of the electromagnetic wave or signal by a particular amount includes changing the value of $kx - \omega t + \Phi$ by the particular amount. For example, an electromagnetic wave or signal that is shifted in phase with regard to $f(x, t)$ by 180 degrees is described by the expression $A \sin(kx - \omega t + \Phi + 180°)$.

The term "phase tuning" refers to shifting the phase of an electronic signal and/or electromagnetic signal by a specific amount to generate an electronic signal and/or electromagnetic signal having a desired phase. For example, a phase-tuned signal may be shifted in phase by 120-240 degrees (e.g., approximately 180°) with respect to a corresponding reflected signal.

The term "dynamic time" refers to a period of time or length of time that is similar to real time or near real time but relates to a dynamic event within a corresponding system. For example, when an interrogating signal is detected, a radar cloaking apparatus may be configured to generate and begin emitting a cloaking signal at a particular point in the phase of the reflected signal generated by the interrogating signal reflecting off of the radar target. For example, in an example embodiment, the particular point in the phase of the reflected signal is defined when the reflected signal is halfway through one waveform. In other words, the particular point in the phase of the reflected signal is when the reflected signal evolved and/or passed through 180 degrees of phase.

The term "adjustable component" refers to a component or feature of a radar target that is movable between two or more different positions or which is otherwise known to cause a change in radar scattering produced by a scattering feature of the radar target. For example, a wing flap or aileron of an airplane or rocket that may be in an un-actuated position or in an actuated position is an example of an adjustable component of a radar target.

The term "target adjustment status" refers to the position of two or more different positions or scattering states that may be defined by an adjustable component of the radar target. For example, continuing with the example of the wing flap of the airplane or rocket being an adjustable component, the target adjustment status indicates whether the wing flap is in the un-actuated position or in the actuated position.

The term "modified model" refers to a model trained to define a scattering element representation of the radar target that corresponds to a modified radar target that is similar to the radar target for which the model was generated. For example, the modified radar target may differ from the radar target in terms of one or more dimensions, one or more reflective features (e.g., a change to a reflection coefficient, a change to an effective shape of a reflective feature, a change in the location of the reflective feature on the radar target, and/or the like), a geometry of the radar target, and/or the like. In an example embodiment, the modified model is generated by modifying at least one parameter of a set of parameters defining at least one scattering element of the model trained to define a scattering element representation of the radar target and/or adding/removing at least one scattering element to/from the model trained to define a scattering element representation of the radar target.

The term "modified scattering element representation" refers to a scattering element representation of a modified radar target provided by a corresponding modified model.

The term "modified predicted reflection signature" refers to a predicted reflection signature, such as an aggregated predicted reflection signature, generated and/or determined based on a modified model.

DETAILED DESCRIPTION

The various embodiments now will be described more fully hereinafter with reference to the accompanying drawings, in which some, but not all embodiments are shown. Indeed, various embodiments may be embodied in many different forms and should not be construed as limited to the embodiments set forth herein; rather, these embodiments are provided so that this disclosure will satisfy applicable legal requirements. Like numbers refer to like elements throughout.

In various scenarios, it may be desired for an object to be able to be located in and/or travel through a region being monitored by a radar system without the object being detected by the radar system. Conventional methods of radar cloaking and/or attempting to make an object less detectable by radar tend to focus on passive radar cloaking such as forming an object with a geometry and surface materials and/or finishes that reduce the power of an interrogating radar signal that is reflected and/or scattered off the object back toward an interrogating radar system. However, such passive radar cloaking strategies may not be appropriate or feasible for every object. Moreover, such passive radar cloaking strategies tend to be less effective at lower radar frequencies (e.g., frequencies less than 4-10 G Thus, there exists a technical problem of how to perform radar cloaking for objects for which such passive radar cloaking strategies are not appropriate or feasible. Additionally, there exists a technical problem of how to perform radar cloaking for objects being interrogated by radar signals having lower radar frequencies (e.g., less than 4-10 GHz). Various embodiments described herein address these technical problems. In particular, various embodiments address the technical problem of how to perform active radar cloaking. Furthermore, various embodiments address the technical problem of how to perform radar cloaking at lower radar frequencies (e.g., frequencies less than 4-10 GHz). For example, various embodiments provide a technical solution to the technical problem of performing active radar cloaking by providing an active radar cloaking apparatus and methods of using an active radar cloaking apparatus. The active radar cloaking apparatus and corresponding methods may be used and are effective at various radar frequencies, including lower radar frequencies (e.g., less than 4-10 GHz).

Various embodiments provide an active radar cloaking apparatus. In various embodiments, the radar cloaking apparatus is and/or is configured to be physically associated and/or coupled to a radar target. The radar cloaking apparatus is configured to generate, transmit, broadcast, and/or emit a cloaking radio signal configured to destructively interfere with a reflected signal generated by an interrogating radar signal scattering and/or reflecting off of the radar target. In various embodiments, the cloaking radio signal is generated at least in part based on a model encoding scattering properties of the radar target.

The radar cloaking apparatus may be configured to receive (e.g., via a receiving antenna) an interrogating radar signal that is incident on the radar target to which the radar cloaking apparatus is (and/or is intended to be) physically associated and/or coupled. An electrical signal may be generated by the receiving antenna responsive to the interrogating radar signal being incident thereon. The electrical signal may be conditioned based on the model encoding scattering properties of the radar target. The conditioned electrical signal may then be provided to an emitting antenna such that the emitting antenna generates, transmits, broadcasts, and/or emits a cloaking radio signal.

In various embodiments, the cloaking radio signal is generated with amplitude, phase, timing, and/or polarization attributes determined based at least on the predicted reflection signature of the radar target. For example, the cloaking radio signal is configured to approximate the reflected signal generated by the interrogating radar signal scattering and/or reflecting off of the radar target and is configured to be out of phase (e.g., in a range of 120-240 degrees and/or by approximately 180 degrees) with the reflected signal. For example, a predicted reflection signature configured to approximate the reflected signal may be determined based on the model encoding scattering properties of the radar target and the cloaking radio signal may be generated based at least in part on the predicted reflection signature.

In various embodiments, the cloaking radio signal destructively interferes with the reflected signal such that the amplitude of the reflected signal observed by the radar system that transmitted and/or broadcasted the interrogating radar signal is reduced and/or minimized. For example, the reflected signal observed by the radar system may be rendered below the detection threshold of the radar system due to the destructive interference of the cloaking radio signal interfering with the reflected signal.

In an example embodiment, the model encoding scattering properties of the radar target is a model trained to define a scattering element representation of the radar target and/or the scattering properties thereof. For example, the scattering properties of the radar target may be approximated by defining a plurality of scattering elements that each approximate the scattering properties of a scattering feature of the radar target. In such an embodiment, a predicted reflection signature is generated for each scattering element that approximates the reflected signal generated by the interrogating radar signal scattering and/or reflecting off the corresponding scattering feature of the radar target.

An aggregated predicted reflection signature may be generated by aggregating, combining, superpositioning, and/or adding each of the predicted reflection signatures. For example, the aggregated predicted reflection signature is generated by spatially and temporally combining the predicted reflection signature for each of the scattering elements of the model trained to define a scattering element representation of the radar target for the interrogation angle and for a roll and/or pitch angle of the radar target. For example, the interrogation angle and the roll and/or pitch angle of the radar target may define and/or determine a viewing angle describing the orientation of the radar target with respect to the interrogating radar signal. The cloaking radio signal may then be generated based on the aggregated predicted reflection signature. For example, the cloaking radio signal may be generated by conditioning an electrical signal generated by an interrogating radar signal being incident on a receiving antenna of the radar cloaking apparatus based at least in part on the aggregated predicted reflection signature. The conditioned electrical signal may then be provided to an emitting antenna of the radar cloaking apparatus to cause the cloaking radio signal to be generated, transmitted, broadcasted, and/or emitted.

Example Model Generation System

In various embodiments, a model encoding scattering properties of a radar target may be generated, determined, and/or the like. In various embodiments, the model encoding scattering properties of the radar target may be at least partially empirically determined (e.g., determined based at least in part on empirical data). In various embodiments, the model encoding scattering properties of the radar target is generated, determined, trained, and/or the like to provide information regarding the scattering properties of the radar target from a plurality of viewing angles (e.g., orientations of the radar target with respect to an interrogating radar signal).

In various embodiments, the model encoding scattering properties of the radar target may take a variety of forms. For example, in an example embodiment, the model encoding scattering properties of the radar target takes the form of a look-up table that indexes the scattering properties of the radar target based on a frequency and/or frequency profile of the interrogating radar signal and the viewing angle. In an example embodiment, the model takes the form of a look-up table describing a set of unique scatterers for a plurality of viewing angles in the range domain. For example, the model may take the form of a look-up table generated based on an N-point model of the radar target in which the radar target is modeled as a plurality of isotropic point scatterers. In an example embodiment, the model takes the form of a compact three-dimensional scattering element representation using manually defined scattering elements. In an example embodiment, such a model is provided as a look-up table. In an example embodiment, the model takes the form of a compact three-dimensional scatter element representation of the radar targets using automatically (e.g., based on analysis and/or processing of radar data generated by scattering and/or reflecting one or more interrogating radar signals off of the radar target from one or more viewing angles) defined scattering elements. In an example embodiment, such a model is provided as a look-up table. Various other models encoding the scattering properties of the radar target may be used and may be provided in a variety of formats, as appropriate for the application.

In various embodiments, the model encoding scattering properties of the radar target is a model trained to define a scattering element representation of the radar target. In various embodiments, the model trained to define a scattering element representation of the radar target is trained and/or generated by interrogating the radar target with one or more interrogating radar signals from one or more interrogation angles and being incident on the radar target at one or more roll and/or pitch angles of the radar target. The reflected signal(s) generated by the interrogating radar signal(s) scattering and/or reflecting off of the radar target may be captured, measured, detected, and/or the like (e.g., by a radar receiver) and analyzed to generate and/or train the model to define the scattering element representation of the radar target.

Figure 1A:
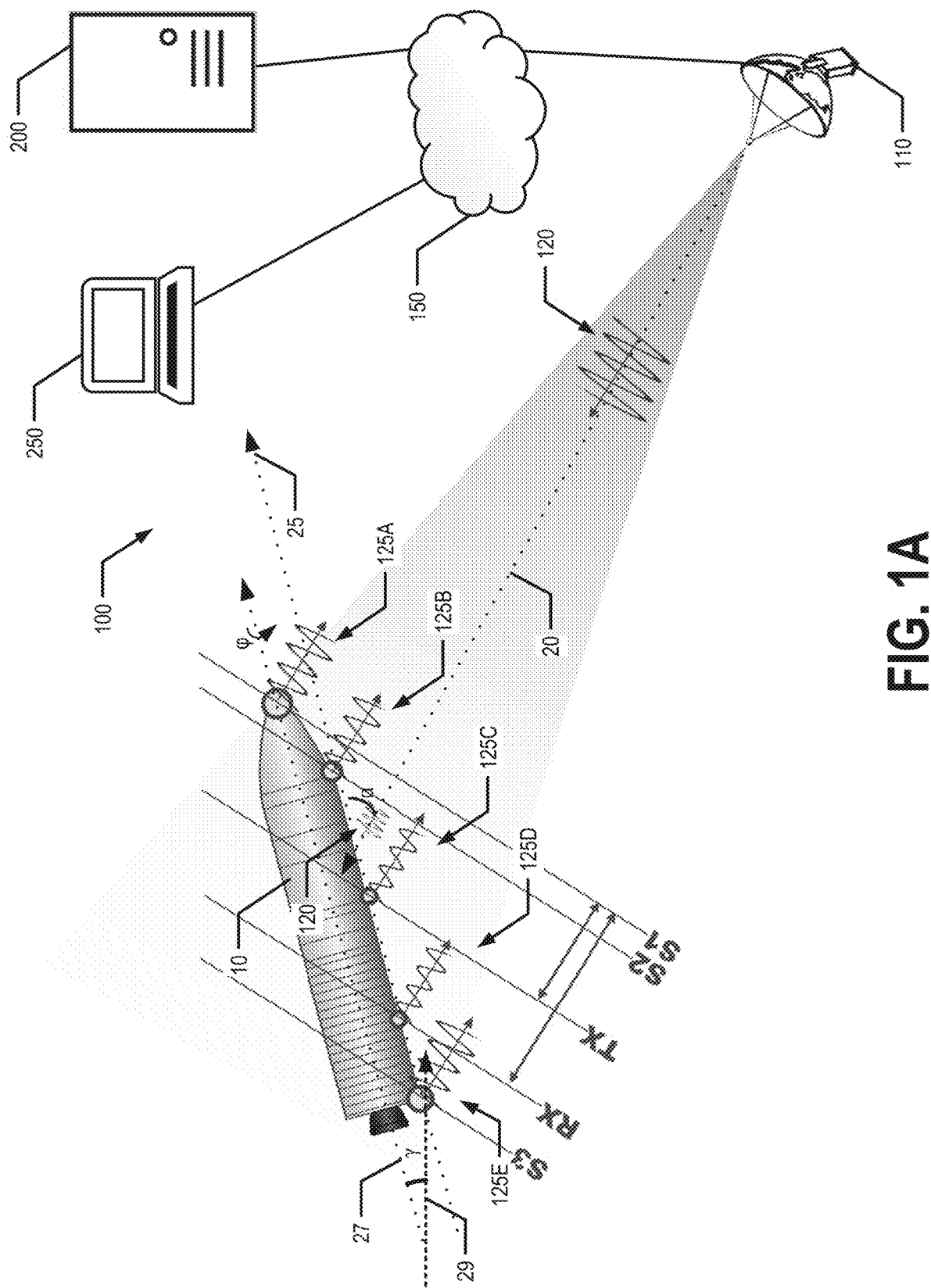
FIG. 1A is a block diagram of an example model generation system comprising a monostatic radar system that may be used to generate a model encoding the scattering properties of a radar target, in accordance with an example embodiment.

FIG. 1A provides a block diagram of an example model generation system 100 that may be used to train and/or generate a model encoding scattering properties of a radar target such as a model defining a scattering element representation of a radar target 10. In the illustrated embodiment, the model generation system 100 comprises a radar system 110 in wired and/or wireless communication (e.g., via one or more networks 150 and/or via direct communication) with a computing entity 200. The computing entity 200 and/or radar system 110 are also in wired and/or wireless communication (e.g., via one or more networks 150 and/or via direct communication) with a user device 250.

The radar system 110 is configured to emit an interrogating radar signal 120 that is incident on the radar target 10 from an interrogation angle α. At least a portion of the interrogating radar signal 120 scatters and/or reflects off of the radar target 10 to generate a reflected signal. In various embodiments, the reflected signal is the superposition and/or combination of the reflection signature generated by the interrogating radar signal 120 off of various points on the surface of the radar target. For example, the reflected signal 125 may be the superposition of reflected signals 125A, 125B, 125C, 125D, 125E each corresponding to the interrogating radar signal 120 scattering and/or reflecting off a scattering feature (e.g., S1, S2, S3, TX, RX) of the radar target 10. The reflected signal is then be captured, measured, and/or detected by the radar system 110.

Various points on the surface of the radar target will be more significant scattering features than other points on the surface of the radar target such that the radar target may be modeled and/or approximated as a collection of scattering features (e.g., rather than as a continuous three-dimensional object). For example, a model may be trained and/or generated that defines a scattering element corresponding to each of the dominant scattering features of the radar target. In various embodiments, the dominant scattering features of the radar target 10 are determined based on the reflected signal as captured, measured, and/or detected by the radar system 110. In various embodiments, the radar system 110 (and/or a plurality of radar systems 110) is used to interrogate the radar target 10 from a plurality of interrogation angles α such that the reflected signal corresponding to the radar target 10 is captured, measured, and/or detected for a plurality of interrogation angles (e.g., two or more interrogation angles).

In various embodiments, the radar system 110 processes the captured, measured, and/or detected reflected signal. In various embodiments, the radar system 110 provides the captured, measured, and/or detected reflected signal and/or information/data corresponding thereto, to a computing entity 200 (e.g., via one or more wired and/or wireless networks 150). The computing entity 200 is configured to receive the captured, measured, and/or detected reflected signal and/or information/data corresponding thereto (e.g., via one or more wired and/or wireless networks 150) and generate and/or train a model defining a scattering element representation of the radar target 10 based on the captured, measured, and/or detected reflected signal and/or information/data corresponding thereto. The model trained to define the scattering element representation of the radar target 10 is then be stored for future use and/or reference; provided (e.g., via one or more wired and/or wireless networks 150) to a user device 250, radar cloaking apparatus, and/or the like; and/or otherwise used to describe the radar target 10 and/or determine a (aggregated) predicted reflection signature for the radar target 10 for one or more interrogation angles.

Figure 1B:
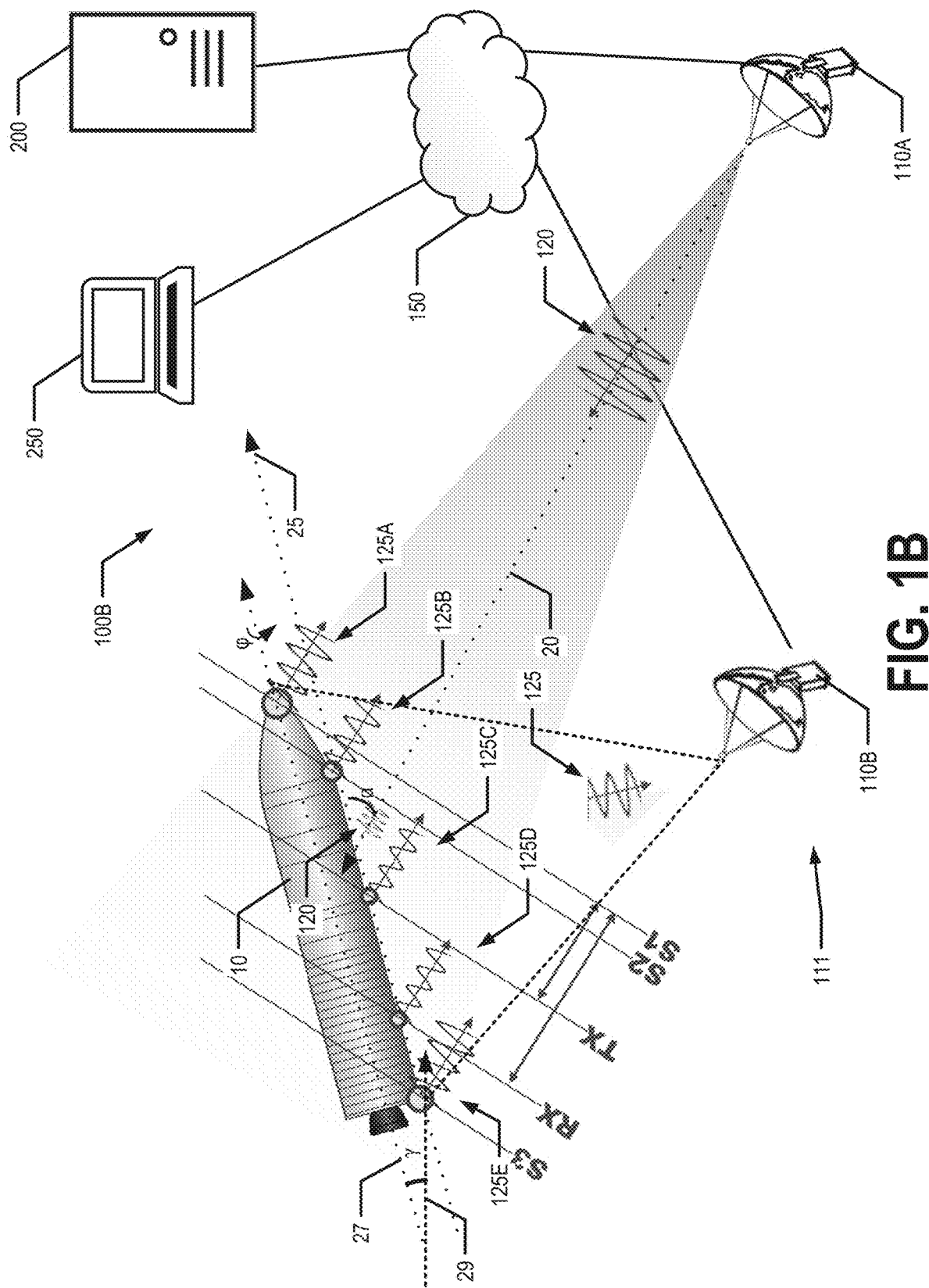
FIG. 1B is a block diagram of an example model generation system comprising a bistatic or multistatic radar system that may be used to generate a model encoding the scattering properties of a radar target, in accordance with an example embodiment.

FIG. 1B provides a block diagram of an example model generation system 100B that may be used to train and/or generate a model encoding scattering properties of a radar target such as a model defining a scattering element representation of a radar target 10. The model generation system 100B is similar to the model generation system 100, but includes a bistatic or multistatic radar system 111. A bistatic or multistatic radar system 111 is a radar system comprising one or more receivers 110B that are not collocated with the one or more emitters 110A. For example, the distance between the emitter 110A and the receiver 100B of the illustrated bistatic radar system 111 may be comparable to the range of an expected target. For example, if the range of an expected target is ten to one hundred kilometers, the emitter 110A and the receiver 100B may be separated by fifty kilometers. For example, in a bistatic or multistatic radar system, an emitter 110A may emit an interrogating radar signal 120 and one or more receivers 110B that are distinct radio antennas from the emitter 110A are used to detect the reflected signal 125. In the illustrated embodiment, the model generation system 100B, comprises a radar system 111 in wired and/or wireless communication (e.g., via one or more networks 150 and/or via direct communication) with a computing entity 200. The computing entity 200 and/or radar system 111 are also in wired and/or wireless communication (e.g., via one or more networks 150 and/or via direct communication) with a user device 250.

In various embodiments, the model defining the scattering element representation of the radar target 10 is used to generate a (aggregated) predicted reflection signature for the radar target 10 for an interrogation angle that is one of and/or different from the one or more interrogation angles for which reflected signals were captured, measured, and/or detected. Additionally, due to the model defining a scattering element representation of the radar target 10, rather than representing the radar target 10 as three-dimensional surface, the model trained to define the scattering element representation of the radar target may be stored using a relatively small amount of memory and may be used to generate a (aggregated) predicted reflection signature for the radar target 10 in a time and computationally efficient manner.

Example Radar System

Figure 2A:
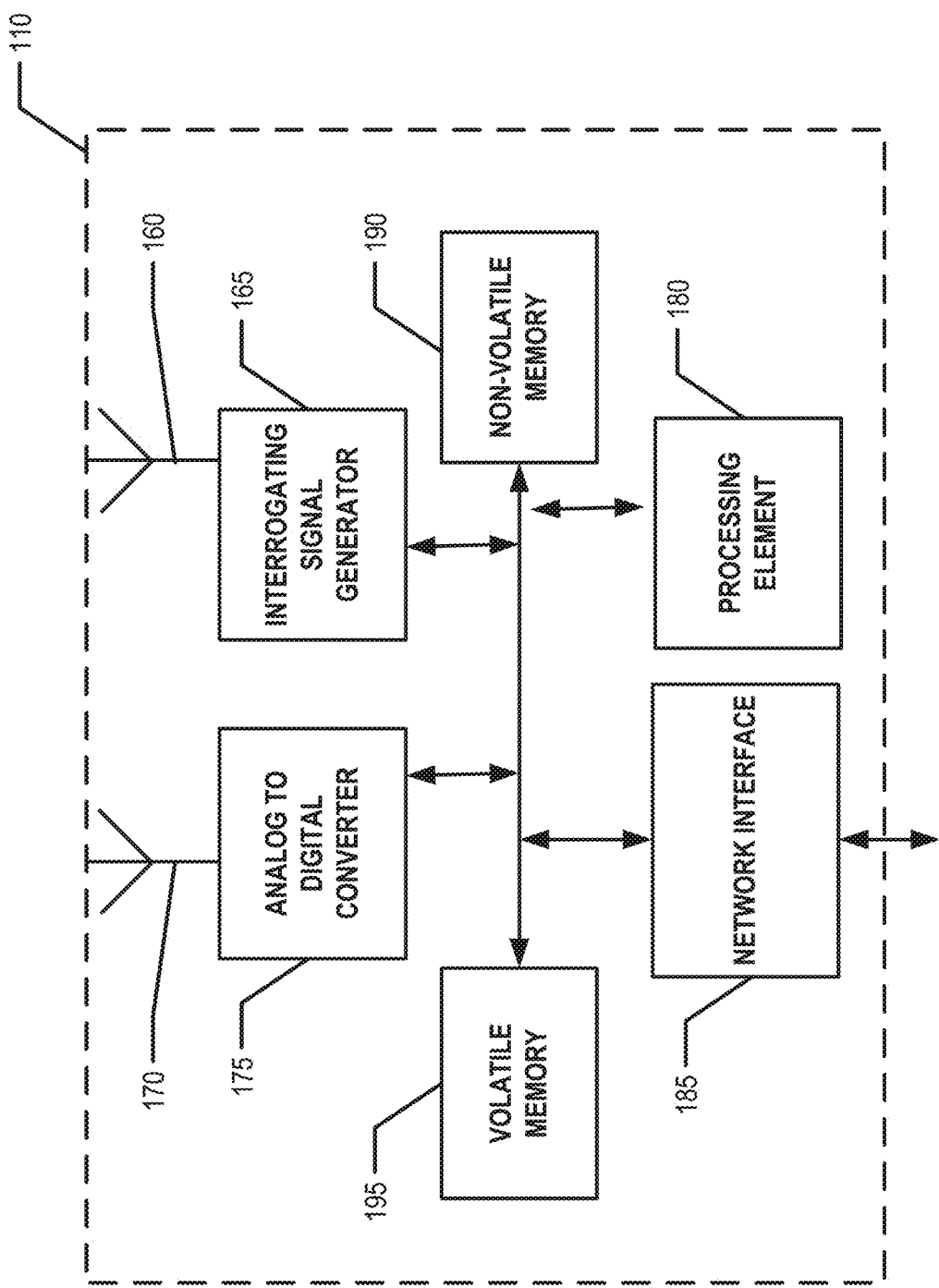
FIG. 2A is a block diagram illustrating components of an example radar system, in accordance with an example embodiment.

FIG. 2A provides a block diagram of an example radar system 110 that may be used in various embodiments. In various embodiments, a radar system 110 is configured to emit an interrogating radar signal; capture, measure, and/or detect a reflected signal generated by the interrogating radar signal reflecting off of the radar target; and provide the captured, measured, and/or detected reflected signal and/or information corresponding thereto.

In various embodiments, the radar system comprises an interrogating antenna 160 and a measuring antenna 170. In the illustrated example embodiment, the interrogating antenna 160 and measuring antenna 170 are physically distinct antennae. However, in an example embodiment, the interrogating antenna 160 and the measuring antenna 170 are physically the same antenna. For example, the radar system may be a monostatic, bistatic, or multistatic radar system. In various embodiments, the interrogating antenna 160 is in communication with an interrogating signal generator 165 configured to cause the interrogating antenna 160 to emit an interrogating radar signal. The measuring antenna 170 is in communication with an analog to digital converter 175 and/or other receiving circuitry configured to digitize a signal generated by the measuring antenna 170 responsive to a radio frequency signal incident thereon. In various embodiments, the radar system further comprises volatile memory 195 and/or non-volatile memory 190, processing element 180, network interface 185, and/or the like. In various embodiments, the processing element 180 is configured to control and/or drive the interrogating signal generator 165 and/or to receive signals from the analog to digital converter 175 and/or other receiving circuitry.

As indicated, in the illustrated embodiment, the radar system 110 also includes one or more network and/or communications interfaces 185 for communicating with various computing entities, such as by communicating data, content, information, and/or similar terms used herein interchangeably that can be transmitted, received, operated on, processed, displayed, stored, and/or the like. For instance, the radar system 110 is configured to communicate with other computing entities 200, one or more user device 250, one or more radar systems 110, and/or the like (e.g., possibly via one or more wired and/or wireless networks 150).

As shown in FIG. 2A, in on the illustrated embodiment, the radar system 110 includes or is in communication with one or more processing elements 180 (also referred to as processors, processing circuitry, and/or similar terms used herein interchangeably) that communicate with other elements within the radar system 110 via a bus, for example, or network connection. As will be understood, the processing element 180 may be embodied in a number of different ways. For example, the processing element 180 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 180 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 180 may be configured for a particular use or configured to execute instructions stored in volatile or non-volatile media or otherwise accessible to the processing element 180. As such, whether configured by hardware or computer program products, or by a combination thereof, the processing element 180 is capable of performing steps or operations according to embodiments of the present invention when configured accordingly.

In the illustrated embodiment, the radar system 110 further includes or is in communication with non-volatile media (also referred to as non-volatile storage, memory, memory storage, memory circuitry and/or similar terms used herein interchangeably). In one embodiment, the non-volatile storage or memory includes one or more non-volatile storage or memory media 190, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In an example embodiment, non-volatile memory 190 is embodied as a data storage device or devices, as a separate database server or servers, or as a combination of data storage devices and separate database servers. Further, in some embodiments, non-volatile memory 190 is embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third party provider and where some or all of the information/data required for the operation of the radar system may be stored. As a person of ordinary skill in the art would recognize, the information/data required for the operation of the radar system may also be partially stored in the cloud data storage system and partially stored in a locally maintained data storage system.

In an example embodiment, non-volatile memory 190 includes information/data generated by radar system(s) 110 and/or the like. More specifically, non-volatile memory 190 may encompass one or more data stores configured to store information/data usable in certain embodiments.

Exemplary Computing Entity

Figure 2B:
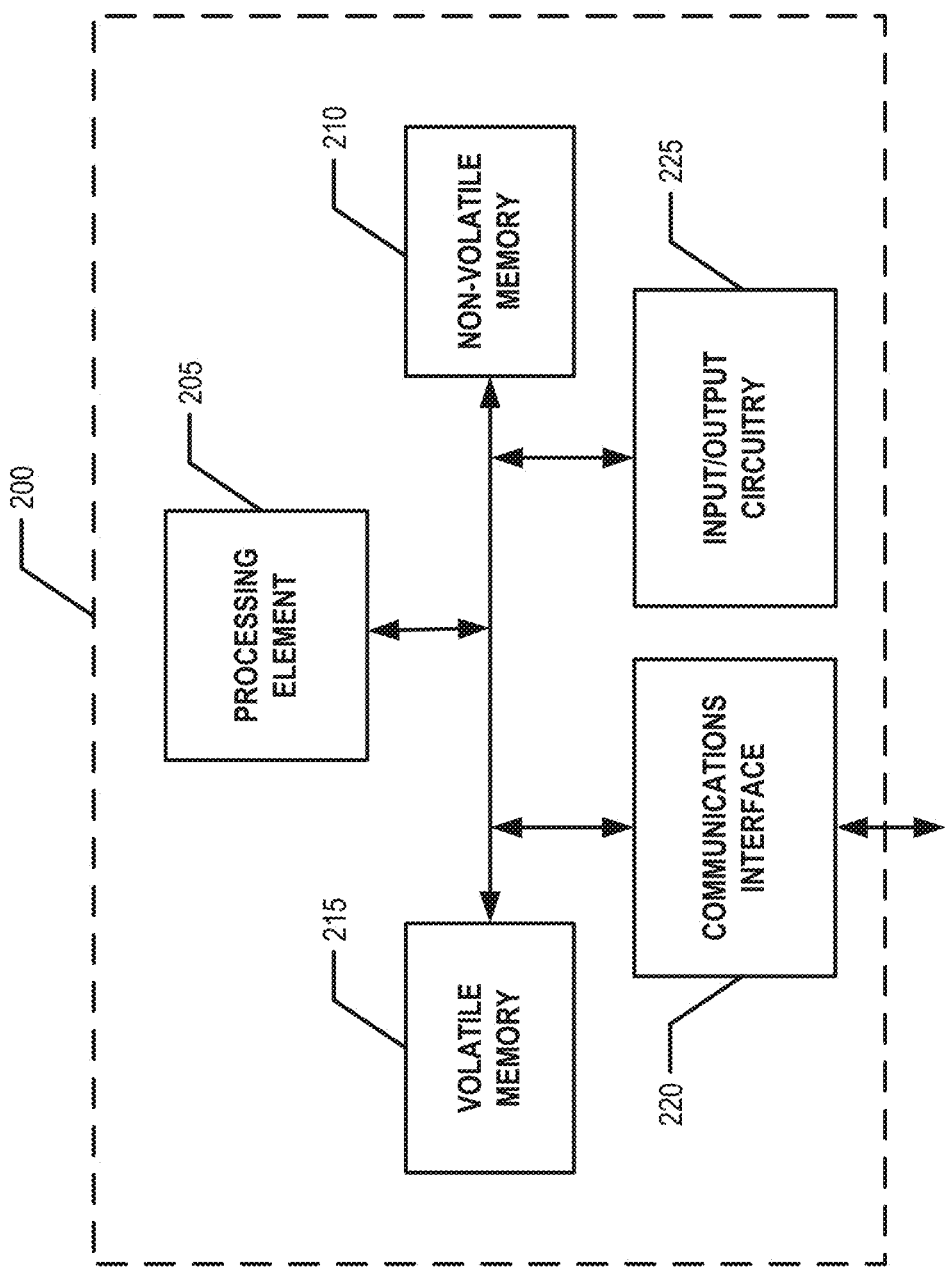
FIG. 2B is a block diagram illustrating components of an example computing entity, in accordance with an example embodiment.

FIG. 2B provides a schematic of circuitry of an example computing entity 200. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As illustrated in FIG. 2B, in accordance with some example embodiments, circuitry of the computing entity 200 includes various means, such as processing element 205, volatile memory 215, non-volatile memory 210, communications and/or network interface 220, and/or input/output circuitry 225. As referred to herein, "circuitry" includes hardware, software and/or firmware configured to perform one or more particular functions. In this regard, the means of the circuitry of the computing entity 200 as described herein are embodied as circuitry, hardware elements (e.g., a suitably programmed processor, combinational logic circuit, and/or the like), a computer program product comprising computer-readable program instructions stored on a non-transitory computer-readable medium (e.g., non-volatile memory 210) that is executable by a suitably configured processing device (e.g., processing element 205), and/or some combination thereof, in various embodiments.

Input/output circuitry 225 is in communication with processing element 205 to receive an indication of a user input and/or to provide an audible, visual, mechanical, or other output to a user (e.g., provider and/or consumer). As such, input/output circuitry 225 includes support, for example, for a keyboard, a mouse, a joystick, a display, a touch screen display, a microphone, a speaker, a RFID reader, barcode reader, biometric scanner, and/or other input/output mechanisms. In embodiments wherein the circuitry of the computing entity 200 is embodied as a server or database, aspects of input/output circuitry 225 may be reduced as compared to embodiments where computing entity 200 is implemented as an end-user machine or other type of device designed for complex user interactions. In an example embodiment (like other components discussed herein), the computing entity 200 does not include input/output circuitry 225. Alternatively, such as in an example embodiment wherein the computing entity 200 is embodied as a server or database, at least some aspects of the input/output circuitry 225 are embodied on an apparatus used by a user that is in communication with the computing entity 200. In the illustrated embodiment, input/output circuitry 225 is in communication with the volatile memory 215, non-volatile memory 210, communications and/or network interface 220, and/or any other component(s), such as via a bus.

As indicated, in one embodiment, the computing entity 200 also includes one or more network and/or communications interfaces 220 for communicating with various computing entities, such as by communicating data, content, information, and/or similar terms used herein interchangeably that can be transmitted, received, operated on, processed, displayed, stored, and/or the like. For instance, the computing entity 200 is configured to communicate with other computing entities, one or more user devices 250, one or more radar systems 110, and/or the like (e.g., possibly via one or more wired and/or wireless networks 150).

As shown in FIG. 2B, in the illustrated embodiment, the computing entity 200 includes or is in communication with one or more processing elements 205 (also referred to as processors, processing circuitry, and/or similar terms used herein interchangeably) that communicate with other elements within the computing entity 200 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry refers to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 is configured for a particular use or configured to execute instructions stored in volatile or non-volatile media or otherwise accessible to the processing element 205. As such, whether configured by hardware or computer program products, or by a combination thereof, the processing element 205 is capable of performing steps or operations according to embodiments of the present invention when configured accordingly.

In the illustrated embodiment, the computing entity 200 further includes or is in communication with non-volatile media (also referred to as non-volatile storage, memory, memory storage, memory circuitry and/or similar terms used herein interchangeably). In one embodiment, the non-volatile storage or memory includes one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In an example embodiment, non-volatile memory 210 is also embodied as a data storage device or devices, as a separate database server or servers, or as a combination of data storage devices and separate database servers. Further, in some embodiments, non-volatile memory 210 is embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third party provider and where some or all of the information/data required for the operation of the relevancy prediction system may be stored. As a person of ordinary skill in the art would recognize, the information/data required for the operation of the computing entity may also be partially stored in the cloud data storage system and partially stored in a locally maintained data storage system.

In an example embodiment, non-volatile memory 210 includes information/data generated by radar system(s) 110, accessed and stored by the computing entity 200 to facilitate the operations of the system, and/or the like. More specifically, non-volatile memory 210 encompass one or more data stores configured to store information/data usable in certain embodiments.

Exemplary User Device

FIG. 2C provides an illustrative schematic representative of a user device 250 that can be used in conjunction with various embodiments. As shown in FIG. 2C, an example embodiment of a user computing entity 250 includes an antenna 262, a transmitter 254 (e.g., a radio transmitter), a receiver 256 (e.g., a radio receiver), and a processing element 258 that provides signals to and receives signals from the transmitter 254 and receiver 256, respectively. The signals provided to and received from the transmitter 254 and the receiver 256, respectively, include signaling information/data in accordance with an air interface standard of applicable wireless systems to communicate with various entities, such as a computing entity 200, another user device 250, and/or the like. In this regard, the user device 250 is capable of operating with one or more air interface standards, communication protocols, modulation types, and access types. More particularly, the user device 250 is configured to operate in accordance with any of a number of wireless communication standards and protocols, in various embodiments. In a particular embodiment, the user device 250 is configured to operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 110A can communicate with various other entities using concepts such as Unstructured Supplementary Service information/data (US SD), Short Message Service (SMS), Multimedia Messaging Service (MMS), Dual-Tone Multi-Frequency Signaling (DTMF), and/or Subscriber Identity Module Dialer (SIM dialer). The user device 250 can also download changes, add-ons, and updates, for instance, to its firmware, software (e.g., including executable instructions, applications, program modules), and operating system.

In various embodiments, the user computing entity comprises one or more processing elements 258 (also referred to as processors, processing circuitry, and/or similar terms used herein interchangeably) that communicate with other elements within the user device 250 via a bus, for example, or network connection. As will be understood, the processing element 258 may be embodied in a number of different ways. For example, the processing element 258 may be embodied as one or more complex programmable logic devices (CPLDs), microprocessors, multi-core processors, coprocessing entities, application-specific instruction-set processors (ASIPs), and/or controllers. Further, the processing element 258 may be embodied as one or more other processing devices or circuitry. The term circuitry may refer to an entirely hardware embodiment or a combination of hardware and computer program products. Thus, the processing element 258 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 258 may be configured for a particular use or configured to execute instructions stored in volatile or non-volatile media or otherwise accessible to the processing element 258. As such, whether configured by hardware or computer program products, or by a combination thereof, the processing element 258 may be capable of performing steps or operations according to embodiments of the present invention when configured accordingly.

The user device 250 also includes a user interface device comprising one or more user input/output interfaces (e.g., a display 266 and/or speaker/speaker driver coupled to a processing element 258 and a touch screen, keyboard 268, mouse, and/or microphone coupled to a processing element 258). For example, the user output interface is configured to provide an application, browser, user interface, dashboard, webpage, and/or similar words used herein interchangeably executing on and/or accessible via the user device 250 to cause display or audible presentation of information/data and for user interaction therewith via one or more user input interfaces. As just one specific example, the user device 250 is configured to output various interface screens associated with a radar system, radar data, model encoding scattering properties of a radar target, predicted reflection signature, and/or the like. The user input interface can comprise any of a number of devices allowing the user device 250 to receive data, such as a keypad 268 (hard or soft), a touch display, voice/speech or motion interfaces, scanners, readers, or other input device. In embodiments including a keypad 268, the keypad 268 can include (or cause display of) the conventional numeric (0-9) and related keys (#, *), and other keys used for operating the user device 250 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user device 250 can collect information/data, user interaction/input, and/or the like.

The user device 250 also includes volatile storage or memory 272 and/or non-volatile storage or memory 274, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions (e.g., with assistance of the processing element 258) of the user device 250. In an example embodiment, the user device memory storage areas (encompassing one or both of the volatile memory 272 and/or non-volatile memory 274) store software for generating a model encoding scattering properties of a radar target based on radar data corresponding to the radar target.

As indicated, in one embodiment, the user device 250 also includes one or more network and/or communications interfaces 270 for communicating with various computing entities, such as by communicating data, content, information, and/or similar terms used herein interchangeably that can be transmitted, received, operated on, processed, displayed, stored, and/or the like. For instance, the user device 250 is configured communicate with computing entities 200, other user devices 250, radar system(s) 110, and/or the like. Such communication may be executed using a wired data transmission protocol, such as universal serial bus (USB), fiber distributed data interface (FDDI), digital subscriber line (DSL), Ethernet, asynchronous transfer mode (ATM), frame relay, data over cable service interface specification (DOCSIS), or any other wired transmission protocol.

Similarly, in various embodiments, the user device 250 is configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The user computing entity 110 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Example Operation of a Model Generation System

In various embodiments, a model generation system 100 may be used to generate a model encoding scattering properties of a radar target, such as a model trained to define a scattering element representation of the radar target. For example, a radar system 110 (or radar system 111) may be used to capture reflected signals generated by interrogating the radar target with interrogating radar signals from one or more interrogation angles and/or viewing angles. In various embodiments, the captured reflected signals may then be used to define and/or determine a model encoding scattering properties of the radar target.

In various embodiments, the model encoding scattering properties of the radar target may take a variety of forms. For example, in an example embodiment, the model encoding scattering properties of the radar target takes the form of a look-up table that indexes the scattering properties of the radar target based on a frequency and/or frequency profile of the interrogating radar signal and the viewing angle. In an example embodiment, the model takes the form of a look-up table describing a set of unique scatterers for a plurality of viewing angles in the range domain. For example, the model may take the form of a look-up table generated based on an N-point model of the radar target in which the radar target is modeled as a plurality of isotropic point scatterers. In an example embodiment, the model takes the form of a compact three-dimensional scattering element representation using manually defined scattering elements. In an example embodiment, the model takes the form of a compact three-dimensional scatter element representation of the radar targets using automatically (e.g., based on analysis and/or processing of radar data generated by scattering and/or reflecting one or more interrogating radar signals off of the radar target from one or more viewing angles) defined scattering elements. For example, in various embodiments, the captured reflected signals may be analyzed and/or processed (e.g., by the radar system 110 and/or the computing entity 200) to generate and/or train a model encoding scattering properties of the radar target (e.g., a model trained to define a scattering element representation of the radar target). Various other models encoding the scattering properties of the radar target may be used and may be provided in a variety of formats, as appropriate for the application.

The model encoding scattering properties of the radar target is then be used to generate a look up table, in an example embodiment. The model encoding scattering properties of the radar target and/or a look up table generated based thereon may be provided for storage in memory 190, 195, 210, 215; transmitted to a computing entity 200 and/or user device 250; provided via input/output circuitry 225 for human review and/or reference; and/or the like.

Figure 3:
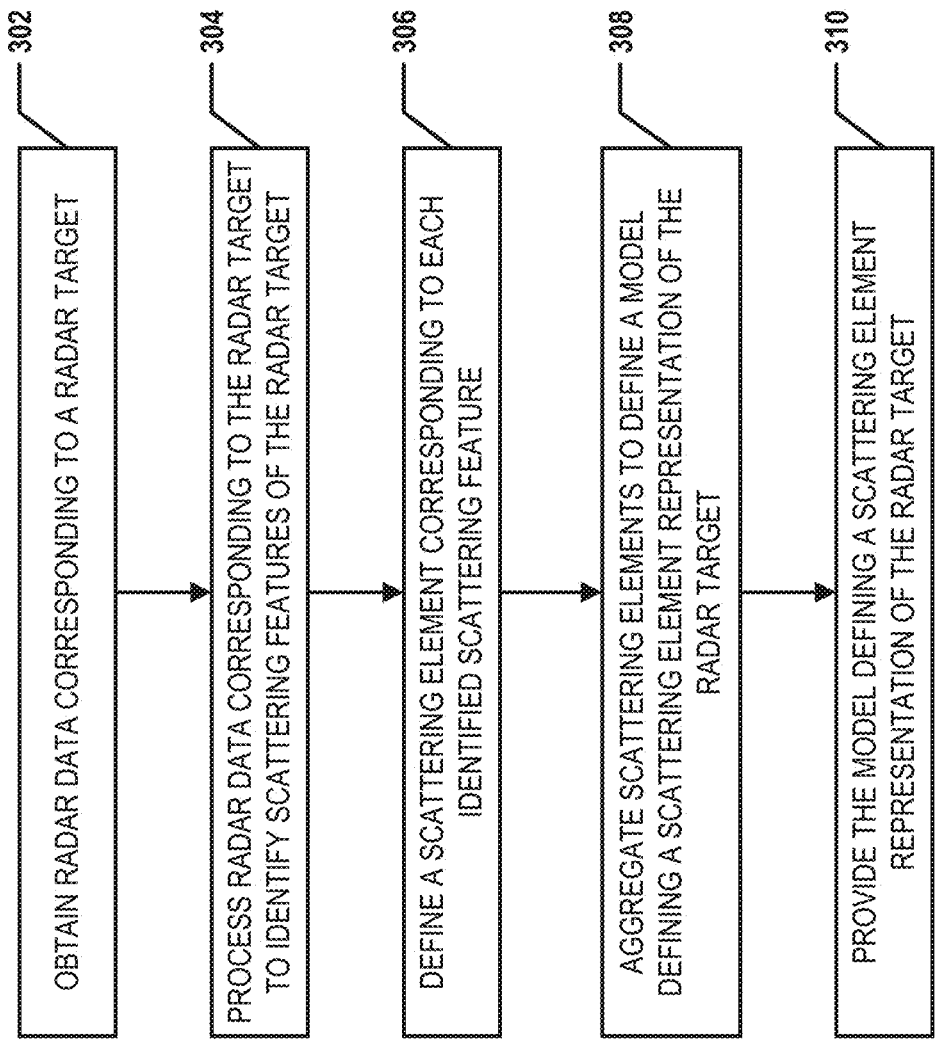
FIG. 3 is a flowchart illustrating processes, steps, procedures, and/or operations for generating a model encoding scattering properties of a radar target, in accordance with an example embodiment.

FIG. 3 provides a flowchart illustrating processes, procedures, operations, and/or the like for generating and/or training a model encoding scattering properties of a radar target. In particular, FIG. 3 provides a flowchart illustrating processes, procedures, operations, and/or the like for generating and/or training a model to define a scattering element representation of a radar target that may be used in accordance with various embodiments. Starting at step/operation 302, radar data corresponding to a radar target is obtained. For example, a radar system 110 emits interrogating radar signals that are incident on the radar target at one or more interrogation angles. The interrogating radar signals scatter and/or reflect off of the radar target, generating reflected signals. The radar system 110 captures, measures, and/or detects the reflected signals. The radar data corresponding to the radar target is generated and/or determined based on the captured, measured, and/or detected reflected signals. In various embodiments, the radar data corresponding to the radar target comprises in-phase and quadrature (I/Q) data. The radar data is stored by the radar system 110 (e.g., in memory 190, 195) and/or provided (e.g., via network interface 185) such that a computing entity 200 receives the radar data corresponding to the radar target. For example, the computing entity 200 may receive the radar data (e.g., via communications interface 220) and may store the radar data in memory (e.g., in memory 210, 215). Thus, the radar system 110 may obtain radar data corresponding to the radar target (e.g., access the radar data from memory 190, 195) and/or the computing entity 200 obtain radar data corresponding to the radar target (e.g., access the radar data from memory 210, 215 and/or via communications interface 220), in various embodiments.

At step/operation 304, the radar data corresponding to the radar target is processed to identify scattering features of the radar target and/or reflection signatures of scattering features of the radar target. For example, the radar system 110 (e.g., via execution of appropriate program code stored in memory 190, 195 via processing element 180) and/or the computing entity 200 (e.g., via execution of appropriate program code stored in memory 210, 215 by the processing element 205) process, analyze, and/or the like the radar data corresponding to the radar target to identify scattering features of the radar target and/or reflection signatures of scattering features of the radar target in the radar data. For example, a reflection signature of a scattering features of the radar target may be identified and/or extracted from the radar data, for each of one or more scattering features of the radar target as represented by the radar data. One example approach would be to segment the viewable angular space of the target into small angular sectors. Then, scattering elements for each sector are extracted from a range profile of the radar data using peak detection. The total response from the target is then determined by evaluating a given viewing geometry and using it to index into one of the defined angular sectors. Another example approach would be to leverage prior knowledge of the target geometry to define expected "tracks" for each scattering element. The known geometry would enable the modeler to define the range to each scattering element as a function of the viewing geometry. The amplitudes and phases for each element can be extracted through linear fitting (e.g. least-squares estimation) techniques.

At step/operation 306, a scattering element is defined for each of the identified scattering features of the radar target. In various embodiments, a scattering element is defined by determining, setting, and/or the like the value of one or more parameters of the scattering element. In various embodiments, the parameters of the scattering element indicate a location of the corresponding scattering feature on the radar target, geometric information regarding the corresponding scattering feature, a reflection coefficient and/or reflection amplitude information for the corresponding scattering feature, and/or other characteristics that affect the scattering properties of the corresponding scattering feature. For example, the radar system 110 (e.g., via execution of appropriate program code stored in memory 190, 195 via processing element 180) and/or the computing entity 200 (e.g., via execution of appropriate program code stored in memory 210, 215 by the processing element 205) processes, analyzes, and/or the like the reflection signature corresponding to a scattering feature of the radar target identified based on the radar data and determines values for one or more parameters to define a scattering element corresponding to the scattering feature of the radar target.

At step/operation 308, a model trained to define a scattering element representation of the radar target is generated by aggregating the scattering elements generated and/or defined corresponding to the scattering features of the radar target identified based on the radar data. For example, the radar system 110 (e.g., via execution of appropriate program code stored in memory 190, 195 via processing element 180) and/or the computing entity 200 (e.g., via execution of appropriate program code stored in memory 210, 215 by the processing element 205) aggregates the scattering elements generated and/or defined corresponding to the scattering features of the radar target identified based on the radar data to generate a model trained to define a scattering element representation of the radar target.

At step/operation 310, the model trained to define a scattering element representation of the radar target is provided. In an example embodiment, the model trained to define a scattering element representation of the radar target is used to generate a look up table and the model trained to define a scattering element representation of the radar target is provided by providing the look up table. In an example embodiment, the look up table comprises information for determining a (aggregated) predicted reflection signature corresponding to the radar target for one or more interrogation angles. In various embodiments, the model trained to define a scattering element representation of the radar target is provided by storing the model trained to define a scattering element representation of the radar target in memory (e.g., memory 190, 195, 210, 215), providing (e.g., transmitting) the model trained to define a scattering element representation of the radar target (e.g., via communications interface 220 and/or network interface 185) such that a computing entity 200 and/or user device 250 receives the model trained to define a scattering element representation of the radar target. In various embodiments, the model trained to define a scattering element representation of the radar target is provided by programming the model trained to define a scattering element representation of the radar target (e.g., the look up table) into a radar cloaking apparatus via software, firmware, hardware, and/or a combination thereof such that computational circuitry of the radar cloaking apparatus may reference the model trained to define a scattering element representation of the radar target.

Example Radar Cloaking Apparatus

Figure 4:
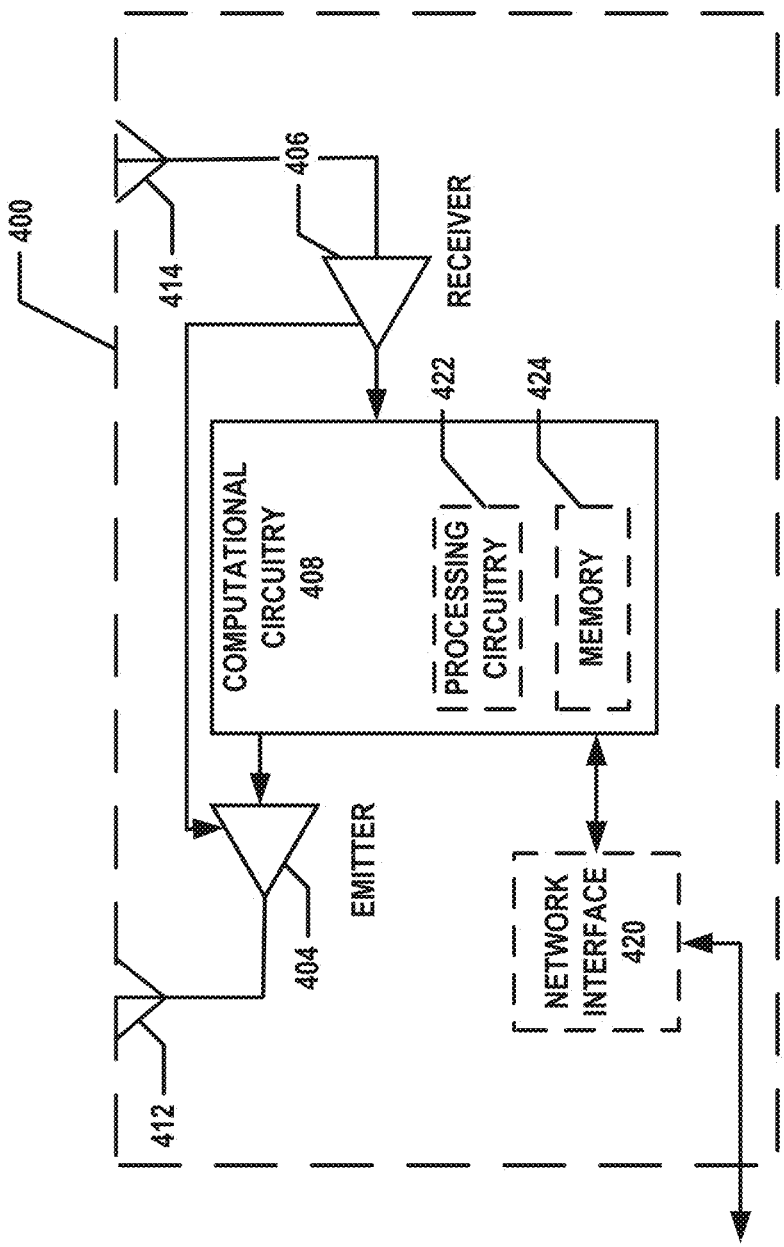
FIG. 4 is a block diagram illustrating components of an example radar cloaking apparatus, in accordance with an example embodiment.

FIG. 4 provides an illustrative schematic representative of a radar cloaking apparatus 400 that can be used in conjunction with various embodiments. In various embodiments, a radar cloaking apparatus 400 is coupled and/or physically associated with and/or configured to be coupled and/or physically associated with a radar target (e.g., an object that may be interrogated by an interrogating radar signal). In various embodiments, a radar cloaking apparatus 400 stores and/or otherwise has access to a model encoding the scattering properties of the radar target (e.g., a model trained to define a scattering element representation of the radar target). The radar cloaking apparatus 400 is configured to reference the model encoding scattering properties of the radar target, for example, in response to detecting an interrogating radar signal, and generate a cloaking radio signal based on the model encoding scattering properties of the radar target and, possibly, characteristics of the interrogating radar signal. In an example embodiment, the radar cloaking apparatus 400 is configured to reference a model trained to define a scattering element representation of the corresponding radar target, generate an aggregated predicted reflection signature based on the referenced model, and generate a cloaking radio signal based on the aggregated predicted reflection signature.

In various embodiments, the radar cloaking apparatus 400 is configured to provide active radar cloaking against interrogation of the radar target for interrogating radar signals in the high frequency (HF-), very high frequency (VHF-), ultrahigh frequency (UHF-), L-, S-, C-, and/or X-bands. In an example embodiment, the radar cloaking apparatus is configured to provide active radar cloaking against interrogation of the radar target for interrogating signals in the HF-, VHF-, UHF, L-, and possibly S-bands.

As shown in FIG. 4, a radar cloaking apparatus 400 includes a emitting antenna 412, an emitter 404 (e.g., a radio signal emitter coupled to the emitting antenna 412), a receiving antenna 414, a receiver 406 (e.g., a radio signal receiver coupled to a receiving antenna 414), and computational circuitry 408 that provides signals to and receives signals from the emitter 404 and receiver 406, respectively. The signals provided to and received from the emitter 404 and the receiver 406, respectively, may include electronic signals corresponding to the detection and/or emission of radar signals such as a received interrogating radar signal and a cloaking radio signal. The receiving antenna 414 and the emitting antenna 412 are configured to receive and/or generate, transmit, broadcast, and/or emit radio wavelength electromagnetic signals, respectively.

For example, the receiving antenna 414 is configured to receive and/or detect a radio signal (e.g., an interrogating radar signal) and provide an electronic signal generated by the radio signal being incident on the receiving antenna 414 to the receiver 406. The receiver 406 is configured to transform, convert, extract information from, and/or the like the electronic signal generated by the radio signal being incident on the receiving antenna 414. For example, the receiver 406 transforms, converts, extracts information from, and/or the like the electronic signal generated by the radio signal being incident on the receiving antenna 414 to provide the electronic signal and/or information extracted therefrom in a form that that the computational circuitry 408 is capable of processing and/or using to perform one or more computations. In an example embodiment, the receiver 406 comprises one or more analog-to-digital converters to convert the signal generated by the receiving antenna 414 into a digital signal. In an example embodiment, the receiver 406 is configured to enable and/or perform processing of the signal generated by the receiving antenna 414 using analog signal processing techniques. For example, in an example embodiment, time limitations for the processing of the signal generated by the receiving antenna may require that the receiver 406 be configured to enable and/or perform processing of the signal generated by the receiving antenna 414 using analog signal processing techniques and/or circuitry. In various embodiments, the receiver 406 comprises receiving circuitry 540, 640L, 640R, and/or the like (see FIGS. 5 and 6).

For example, the emitter 404 is configured to receive one or more electrical signals from the computational circuitry 408 and/or receiver 406, condition the electronic signal, and provide the conditioned electronic signal to the emitting antenna 412 such that the emitting antenna generates, transmits, broadcasts, and/or emits one or more radio signals (e.g., cloaking radio signals). In an example embodiment, the emitter 404 comprises emitting circuitry 545, 645L, 645R, and/or the like.

In an example embodiment, the receiving antenna 414 and the emitting antenna 412 are be the same physical antenna. In an example embodiment, the receiving antenna 414 and the emitting antenna 412 are physically distinct antennae. In various embodiments, the radar cloaking apparatus 400 comprises and/or is in communication with a plurality of receiving antennas 414 and/or emitting antennas 412 coupled and/or physically associated at various positions of the corresponding radar target. For example, in an example embodiment, one or more of receiving antennas 414 and/or emitting antennas 412 of the radar cloaking apparatus 400 and/or in communication therewith are affixed and/or disposed at the front of the radar target and another one or more receiving antennas 414 and/or emitting antennas 412 of the radar cloaking apparatus 400 and/or in communication therewith are affixed and/or disposed at the back of the radar target. In various embodiments, other receiving antennas 414 and/or emitting antennas 412 of the radar cloaking apparatus 400 and/or in communication therewith are affixed and/or disposed at various positions between the front and the back of and/or along the radar target.

Similarly, in various embodiments, one or more of receiving antennas 414 and/or emitting antennas 412 of the radar cloaking apparatus 400 and/or in communication therewith are affixed and/or disposed on a right side of the radar target and another one or more receiving antennas 414 and/or emitting antennas 412 of the radar cloaking apparatus 400 and/or in communication therewith are affixed and/or disposed on a left side of the radar target.

In an example embodiment, one or more of the receiving antennas 414 are configured to receive electromagnetic signals having a first polarization (e.g., right-hand polarization) and another one or more of the receiving antennas 414 are configured to receive electromagnetic signals having a second polarization (e.g., left-hand polarization). In an example embodiment, one or more of the emitting antennas 412 are configured to generate, transmit, broadcast, and/or emit electromagnetic signals having a first polarization (e.g., right-hand polarization) and another one or more of the emitting antennas 412 are configured to generate, transmit, broadcast, and/or emit electromagnetic signals having a second polarization (e.g., left-hand polarization).

In various embodiments, the radar cloaking apparatus 400 comprises computational circuitry 408. In various embodiments, the computational circuitry 408 is configured to reference the model encoding the scattering properties of the radar target (e.g., a model trained to define a scattering element representation of the radar target, in an example embodiment) and determine a (aggregated) predicted reflection signature based at least thereon. In an example embodiment, the computational circuitry 408 is a circuit hardwired to perform one or more functions. In the illustrated embodiments of FIGS. 5 and 6, the computational circuitry 408 comprises amplifiers (e.g., low noise amplifiers (LNAs)), frequency phase detectors, filters (e.g., LPFs, HPFs, band filters, and/or the like), delay lines, multiplexers and/or combiners, demultiplexers and/or splitters, phase locked loops, waveform generators (e.g., arbitrary waveform generator (AWG), direct digital synthesis (DDS), and/or the like), voltage detectors, and/or the like. In various embodiments, the computational circuitry 408 is configured for a particular use and, in various embodiments, the computational circuitry 408 is configured to execute instructions stored in volatile or non-volatile media or otherwise accessible to the computational circuitry 408.

For example, in the illustrated embodiment, the computational circuitry 408 comprises processing circuitry 422. For example, the processing circuitry 422 comprises one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. For example, the processing circuitry 422 is configured to execute computer-readable instructions stored in memory 424 and/or otherwise accessible to the computational circuitry 408 to cause the radio cloaking apparatus 400 to perform various functions.

In the illustrated embodiment, the computational circuitry 408 further comprises non-transitory memory 424 configured to store computer-executable instructions that may be executed and/or processed by one or more portions of the computational circuitry to cause the computational circuitry 408 to perform particular functions. For example, in the illustrated embodiment, the model encoding the scattering properties of the radar target (e.g., a model defining the scattering element representation of the radar target) is stored in memory 424. In an example embodiment, the memory 424 stores the model encoding the scattering properties of the radar target as a look up table. In various embodiments, the memory 424 may include volatile storage or memory and/or non-volatile storage or memory, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store one or more models, databases, database instances, data, applications, programs, program modules, scripts, source code, object code, byte code, compiled code, interpreted code, machine code, executable instructions, and/or the like to implement the functions (e.g., with assistance of the processing circuitry 408) of the radar cloaking apparatus 400.

In an example embodiment, the radar cloaking apparatus 400 also includes one or more network and/or communications interfaces 420 for communicating with various computing entities, such as by communicating data, content, information, and/or similar terms used herein interchangeably that can be transmitted, received, operated on, processed, displayed, stored, and/or the like. For instance, in an example embodiment, the radar cloaking apparatus 400 is configured to communicate with computing entities 200, user devices 250, and/or the like. For example, in an example embodiment, the radar cloaking apparatus 400 is configured to receive a model encoding the scattering properties of the radar target provided (e.g., transmitted) by a computing entity 200 or user device 250, provide (e.g., transmit) information regarding the detection of an interrogating radar signal by the radar cloaking apparatus 400, provide (e.g., transmit) information regarding cloaking radio signals generated, transmitted, broadcasted, and/or emitted by the radar cloaking apparatus 400, and/or the like.

In various embodiments, the network and/or communications interfaces 420 are configured to communicate via one or more wired communications protocols (e.g., when the radar target is located within a hanger, garage, or the like and may be placed into wired communication with a computing entity 200 and/or user device 250). In various embodiments, such communication is executed using a wired data transmission protocol, such as universal serial bus (USB), fiber distributed data interface (FDDI), digital subscriber line (DSL), Ethernet, asynchronous transfer mode (ATM), frame relay, data over cable service interface specification (DOCSIS), or any other wired transmission protocol.

Similarly, in various embodiments, the radar cloaking apparatus 400 is configured to communicate (e.g., via communications interface 420) via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol appropriate for the application.

In various embodiments, the radar cloaking apparatus 400 uses such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Figure 5:
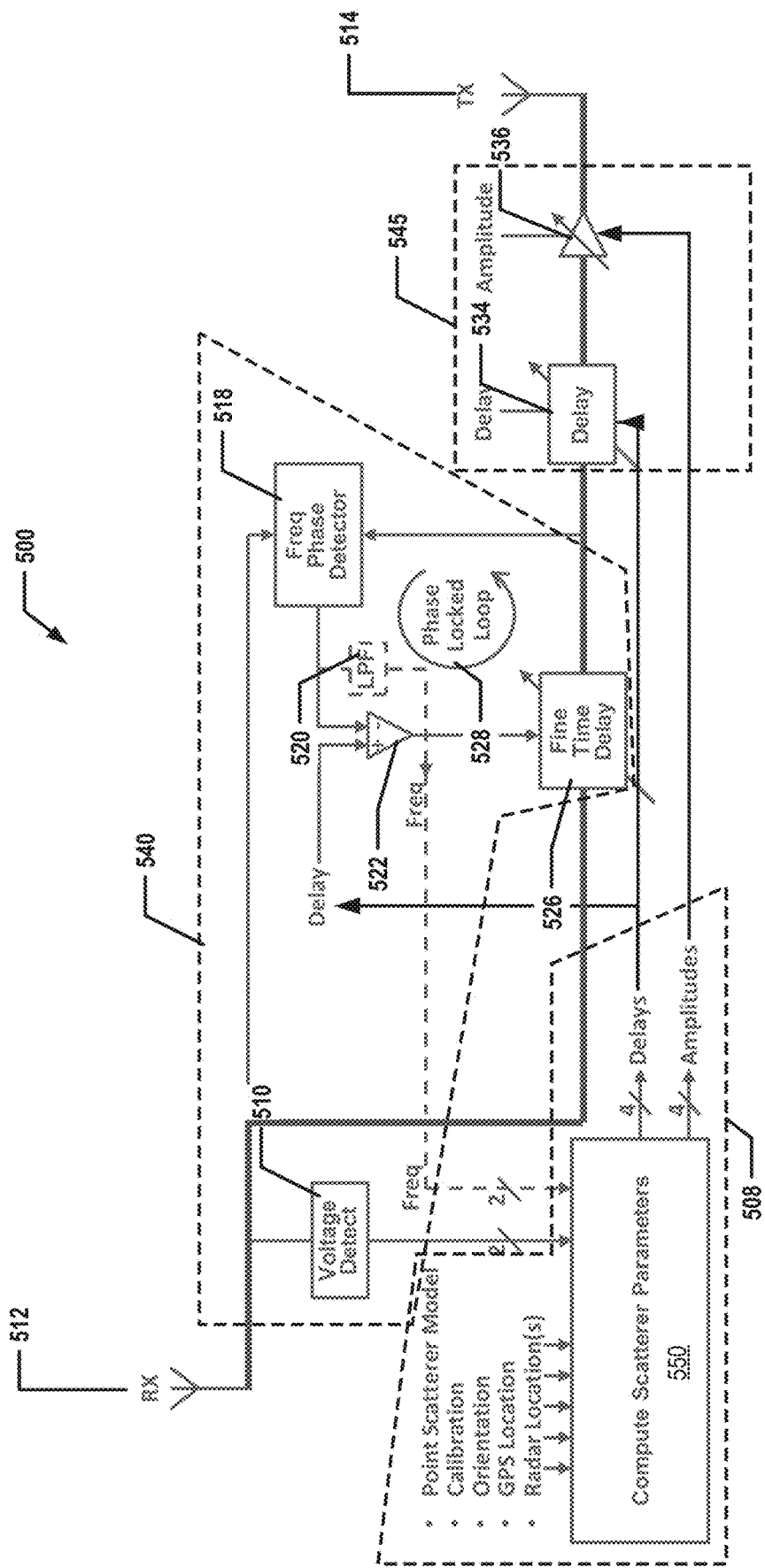
FIG. 5 is a simplified circuit diagram of a portion of an example radar cloaking apparatus, in accordance with an example embodiment.
Figure 6:
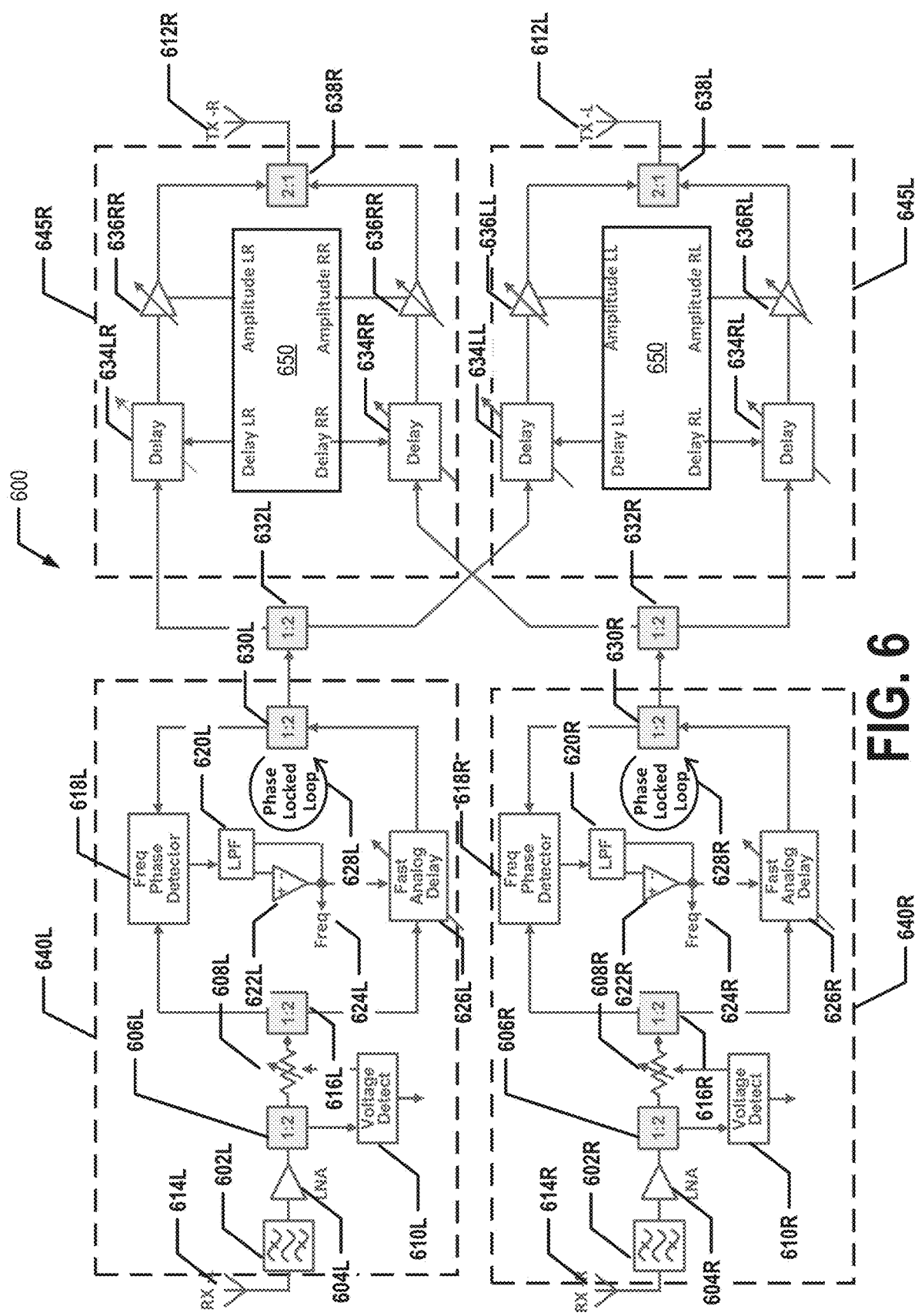
FIG. 6 is a simplified circuit diagram of a portion of another example radar cloaking apparatus, in accordance with an example embodiment.

FIGS. 5 and 6 provide simplified circuit diagrams of two example embodiments of a radar cloaking apparatus 500, 600. The radar cloaking apparatus 500, 600 comprises receiving circuitry 540, 640R, 640L and emitting circuitry 545, 645R, 645L. In various embodiments, a radar cloaking apparatus may comprise an instance of receiving circuitry and an instance of emitting circuitry corresponding to and/or configured to operate at each radar band (e.g., HF-, VHF-, UHF-, L-, S-, C-, and/or X-bands) at which the radar cloaking apparatus is configured to operate (e.g., detect an interrogating radar signal having a frequency or frequency profile corresponding to a radar band and emit a cloaking radio signal at having a frequency or frequency profile corresponding to the radar band). In an example embodiment, the radar cloaking apparatus may comprise multiple instances of receiving circuitry and multiple instances of emitting circuitry, which each instance of receiving circuitry and each instance of emitting circuitry corresponding to a group of radar bands. For example, the radar cloaking apparatus may comprise an instance of receiving circuitry and an instance of emitting circuitry configured to operate in the HF, VHF, and UHF-bands (e.g., approximately 3 MHz to 1 GHz) and an instance of receiving circuitry and an instance of emitting circuitry configured to operate in the L, S, C, and/or X-bands (e.g., approximately 1 GHz to 12 GHz). In an example embodiment, the radar cloaking apparatus comprises one instance of receiving circuitry and one instance of emitting circuitry configured to operate at the entire frequency range of operation of the radar cloaking apparatus.

FIG. 5 illustrates a simplified circuit diagram of an example embodiment of a radar cloaking apparatus 500. For example, the radar cloaking apparatus 500 comprises or is in communication with a receiving antenna 514 and an emitting antenna 512. The radar cloaking apparatus 500 comprises receiving circuitry 540 and emitting circuitry 545. The receiving circuitry 540 is configured to determine and/or identify an interrogating radar signal incident upon the corresponding radar target based on an electrical signal generated by the interrogating radar signal being incident on the receiving antenna 514 and generate an extracted information signal from the electrical signal. The emitting circuitry 545 may be configured to receive at least a portion of the extracted information signal generated by the receiving circuitry 540 and, based at least in part on the at least a portion of the extracted information signal and the (aggregated) predicted reflection signature determined by the computational circuitry 508, condition the at least a portion of the extracted information signal to cause the emitting antenna 512 to emit a cloaking radio signal.

In the illustrated embodiment, the receiving antenna 514 is in communication with a voltage detector 510, such that the voltage detector 510 is configured to determine a voltage of an electrical signal generated by the receiving antenna 514. For example, the receiving antenna 514 is configured such that when a radio frequency signal (e.g., an interrogating radar signal) is incident on the receiving antenna 514, the receiving antenna 514 generates an electrical signal. The voltage of the electrical signal generated by an interrogating signal being incident on the receiving antenna 514 is determined by the voltage detector 510. In an example embodiment, the voltage determined by the voltage detector 510 and/or a signal indicative thereof is provided to computational circuitry 508 of the radar cloaking apparatus 500. For example, the computational circuitry 508 uses the voltage determined by the voltage detector 510 and/or the signal indicative thereof to determine a scale and/or amplitude of a predicted reflection signature corresponding to the radar target.

In the illustrated embodiment, the voltage detector 510 is configured to, once the voltage of the electrical signal generated by the receiving antenna 514 is determined, provide the electrical signal to a frequency and phase detector 518. For example, the frequency and phase detector is configured to determine a phase and/or phase profile and frequency and/or frequency profile/spectrum of the radio frequency signal (e.g., the interrogating radar signal) that was incident on the receiving antenna 514 to generate the electrical signal. In the illustrated embodiment, the output of the frequency and phase detector 518 is provided as a first input to an amplifier 522. In the illustrated embodiment, the output of the frequency and phase detector 518 is also provided to computational circuitry 508 configured to reference a model encoding the scattering properties of the radar target (e.g., a model trained to define a scattering element representation of the radar target). The radar target for which the scattering properties are encoded by the model encoding the scattering properties of the radar target is the radar target to which the radar cloaking apparatus is physically coupled and/or associated with or a radar target to which the radar cloaking apparatus is intended to be physically coupled and/or associated with. In an example embodiment, the output of the phase detector 518 is passed through a low pass filter 520 and then provided to the computational circuitry 508.

The low pass filter (LPF) 520 is configured to pass frequencies below a cut off frequency and suppress frequencies above the cut off frequency. In various embodiments, the cut off frequency of the LPF 520 is substantially equal to or less than 10% of a radar frequency of interest. In an example embodiment, the cut off frequency of the LPF 520 is substantially equal to 3.5% of radar frequency of interest. In an example embodiment, the radar frequency of interest is a central, bounding (e.g., upper bound or lower bound), or characteristic frequency of a frequency waveband of interest (e.g., the radar band(s) that the instance of receiving circuitry 540 is configured to operate at). For example, in an example embodiment, instance of receiving circuitry 540 is configured to operate in the UHF-band (having a central frequency of approximately 400 MHz) and the cut off frequency is less than 40 MHz (e.g., approximately 14 MHz). In various embodiments, the cut off frequency of the LPF 520 may be influenced by various factors, such as the radar pulse width.

In various embodiments, the computational circuitry 508 comprises circuitry similar to that described with respect to computational circuitry 408. The computational circuitry 408 uses the determined phase and/or phase profile and frequency and/or frequency profile/spectrum to determine a phase and/or frequency profile/spectrum of one or more predicted reflection signatures corresponding to the radar target. For example, the computational circuitry 508 determines delay information based on phase and/or frequency information determined from the output of the frequency and phase detector 518. In an example embodiment, the delay information corresponds to aligning a phase of a reflected signal generated by the detected radio frequency signal scattering and/or reflecting off of the radar target with the phase of one or more predicted reflection signatures for the radar target (e.g., each corresponding to a scattering element of a model trained to define a scattering element representation of the radar target) such that the cloaking radio signal to be emitted by and/or caused to be emitted by the radar cloaking apparatus 500 can be shifted in phase with respect to the reflected signal. For example, the phase of the cloaking radio signal is shifted in phase with respect to the phase of the reflected signal such that the cloaking radio signal is out of phase (e.g., by 120-240 degrees, by 180 degrees) with the reflected signal. In an example embodiment, the delay information is used to provide a second input to the amplifier 522.

In an example embodiment, the computational circuitry 508 is configured to determine whether the detected radio signal (e.g., the radio signal incident on the receiving antenna 514) matches a frequency or frequency profile/spectrum for an expected signal for an interrogating radar signal. In an example embodiment, the determination of whether the detected frequency or frequency profile/spectrum of the detected signal matches that expected for an interrogating radar signal is based at least in part on the location of the radar target and a priori information such as information regarding radar systems known to exist near the location of the radar target stored in memory of and/or accessible to the radar cloaking apparatus (e.g., memory 424). In an example embodiment, the frequency or frequency profile/spectrum is used to determine the frequency and/or frequency profile/spectrum with which the cloaking radio signal should be generated, transmitted, broadcasted, and/or emitted.

In an example embodiment, the amplifier 522 is configured to provide an output of the amplifier 522 to a time delay element 526. In an example embodiment, the time delay element 526 is a fine time delay element. Various time and/or phase shifter components are used as the time delay element 526, in various embodiments. In the illustrated embodiments, the time delay element 526 is configured such that an output thereof is split into two similar and/or equivalent extracted information signals. One of the extracted information signals is provided as feedback to the phase and frequency detector 518, via a phase locked loop 528. The other of the extracted information signals is provided to the emitting circuitry 545.

In various embodiments, the emitting circuitry 545 comprises one or more delay elements 534 and one or more amplifiers 536. For example, the delay elements 534 and the amplifiers 536 are configured to receive signals generated based on the model encoding the scattering properties of the radar target and/or information derived therefrom. For example, the computational circuitry 508 receives phase and/or frequency information, voltage and/or amplitude information, direction information, and/or the like regarding a radio frequency signal (e.g., an interrogating radar signal) detected by the receiving antenna 514 and, based on the model encoding the scattering properties of the radar target (e.g., a model trained to define a scattering element representation of the radar target), may determine delay information and/or amplitude information regarding an expected reflected signal generated by the detected radio frequency signal reflecting off of the radar target. For example, in the illustrated embodiment, the computational circuitry 508 of the radar cloaking apparatus 500 is configured to generate a predicted reflection signature 550 for the radar target based on the model encoding the scattering properties of the radar target (e.g., a model trained to define a scattering element representation of the radar target); the voltage information, frequency information, and/or phase information determined based on the detected interrogating radar signal; and/or the like.

The delay and/or amplitude information regarding the expected reflected signal is used to condition the electrical signal(s) passing through the emitting circuitry 545 such that the phase is adjusted (e.g., by introducing a delay via the delay element(s) 534) and/or the amplitude is adjusted (e.g., via the amplifier(s) 536) such that the amplitude of the cloaking radio signal (e.g., generated, transmitted, broadcasted, and/or emitted by the emitting antenna 512) is approximately equal to the amplitude of the reflected signal and/or the phase of the cloaking radio signal is shifted in phase (e.g., by 120-240 degrees, 135-225 degrees, 150-210 degrees, 170-190 degrees, 175-185 degrees, and/or approximately 180 degrees out of phase, according to various embodiments) with respect to the reflected signal. For example, the amplitude and/or phase of the portion of the extracted information signal may be adjusted such that a radar cloaking signal that approximates the predicted reflection signature 550 (but with a controlled shift in phase) is generated. For example, the computational circuitry may provide controlling signals to the delay element(s) 534 and/or amplifier(s) 536 such that the delay element(s) 534 and/or amplifier(s) 536 adjust the phase and/or amplitude of the portion of the extracted information signal provided to the emitting circuitry 545 to generate a conditioned electrical signal.

The conditioned electrical signal is provided to the emitting antenna 512, causing the emitting antenna 512 to emit a cloaking radio signal based on the conditioned electrical signal. For example, the emitting antenna 512 is caused to generate, transmit, broadcast, and/or emit a cloaking radio signal based on the conditioned electrical signal such that the emitted cloaking radio signal is of approximately the same amplitude as a reflected signal generated by the interrogating radar signal scattering and/or reflecting off of the corresponding radar target. For example, the emitting antenna 512 is caused to generate, transmit, broadcast, and/or emit a cloaking radio signal based on the conditioned electrical signal such that the emitted cloaking radio signal is shifted in phase (e.g., by 120-240 degrees, 135-225 degrees, 150-210 degrees, 170-190 degrees, 175-185 degrees, and/or approximately 180 degrees out of phase, according to various embodiments) with respect to a reflected signal generated by the interrogating radar signal scattering and/or reflecting off of the corresponding radar target. For example, in various embodiments, the cloaking radio signal has approximately the same amplitude as the reflected signal and is shifted in phase by 120-240 degrees, 135-225 degrees, 150-210 degrees, 170-190 degrees, 175-185 degrees, and/or approximately 180 degrees out of phase with respect to the reflected signal such that the destructive interference between the cloaking radio signal and the reflected signal renders the reflected signal observed by the radar system that transmitted and/or broadcasted the interrogating radar signal to be below the detection threshold of the radar system.

FIG. 6 illustrates another example implementation of the circuitry of a radar cloaking apparatus 600. The illustrated radar cloaking apparatus 600 uses dual polarization antennas with cross polarization terms to generate a cloaking radio signal. The example radar cloaking apparatus 600 comprises and/or is in communication with a left receiving antenna 614L configured to receive and/or detect radio signals and/or components of radio signals incident on the corresponding radar target that are left-hand polarized and a right receiving antenna 614R configured to receive and/or detect radio signals and/or components of radio signals incident on the corresponding radar target that are right-hand polarized. The example radar cloaking apparatus 600 further comprises and/or is in communication with a left emitting antenna 612L configured to emit a left-hand polarized component of a radio cloaking signal and a right emitting antenna 612R configured to emit a right-hand polarized component of a radio cloaking signal.

The radar cloaking apparatus comprises left receiving circuitry 640L and right receiving circuitry 640R. In various embodiments, the left receiving circuitry 640L is configured to determine and/or identify an interrogating radar signal and/or left-hand polarized component of an interrogating radar signal incident upon the corresponding radar target as detected by the left receiving antenna 614L and/or to determine and/or extract information/data regarding the interrogating radar signal and/or the left-hand polarized component of the interrogating radar signal incident upon the corresponding radar target from the interrogating radar signal as captured and/or detected by the left receiving antenna 614L. In various embodiments, the right receiving circuitry 640R is configured to determine and/or identify an interrogating radar signal and/or right-hand polarized component of an interrogating radar signal incident upon the corresponding radar target as detected by the right receiving antenna 614R and/or to determine and/or extract information/data regarding the interrogating radar signal and/or the right-hand polarized component of the interrogating radar signal incident upon the corresponding radar target from the interrogating radar signal as captured and/or detected by the right receiving antenna 614R.

The left receiving circuitry 640L of the radar cloaking apparatus 600 is configured such that an electrical signal generated by a radio signal, an interrogating radar signal, and/or the like and/or the left-hand polarized component thereof being incident on the left receiving antenna 614L is filtered by a bandpass filter 602L.

In various embodiments, the frequency range or band passed by the bandpass filter 602L is the operational frequency range of the corresponding instance of left receiving circuitry 640L. For example, in an example embodiment where the left receiving circuitry 640L is configured to operate at a single radar band (e.g., the HF-band, the VHF-band, the UHF-band, the L-band, C-band, S-band, or X-band), the bandpass filter 602L is configured to pass the corresponding frequency range. For example, for an instance of left receiving circuitry 640L configured to operate at the UHF-band, the central frequency of the band passed by the bandpass filter 602L is approximately 40 MHz. Moreover, the band passed by the bandpass filter 602L has a bandwidth of approximately 10% of the central frequency of the band, in various embodiments. Thus, in the example of the left receiving circuitry 640L operating at the UHF-band, the bandpass filter 602L is configured to pass the frequency band 380-420 MHz, in an example embodiment. For example, in an example embodiment where the left receiving circuitry 640L is configured to operate at a group of radar bands (e.g., the HF-band, the VHF-band, and the UHF-band; or the L-band, C-band, S-band, and X-band), the bandpass filter 602L is configured to pass the corresponding frequency range. For example, in an example embodiment where the left receiving circuitry 640L is configured to operate at the entire frequency operating range of the radar cloaking apparatus 600 (e.g., the HF-band, the VHF-band, the UHF-band, the L-band, C-band, S-band, and X-band), the bandpass filter 602L is configured to pass the corresponding frequency range.

The filtered signal is provided to an amplifier 604L, such as a low noise amplifier, configured to amplify the filtered signal without introducing a significant amount of noise to the resulting amplified signal. The amplified signal is provided to a splitter 606L, such as a 1:2 splitter, configured to split the amplified signal into a first left signal and a second left signal. The first left signal is provided to voltage detector 610L which monitors the voltage across variable resistor 608L to determine a voltage and/or amplitude of the second left signal. For example, the determined voltage and/or amplitude of the second left signal (and/or an electrical signal indicative thereof) may be provided to computational circuitry (not shown for clarity) of the radar cloaking apparatus 600 (e.g., comprising circuitry similar to computational circuitry 408, in various embodiments). In various embodiments, the voltage and/or amplitude of the second left signal is used (e.g., by the computational circuitry) to determine the ratio of the power and/or energy in the left-hand polarized and the right-hand polarized components of the interrogating radar signals, determine the total power and/or amplitude of the interrogating radar signal, and/or the like. The second left signal is provided to the variable resistor 608L. The variable resistor 608L is configured to provide the second left signal to a splitter 616L.

In various embodiments, the splitter 616L is a 1:2 splitter. For example, the splitter 616L may be configured to split the second left signal into a left detector signal and a left delay signal. The left detector signal is provided to a frequency and phase detector 618L configured to detect the frequency and phase of the left detector signal. The frequency and phase detector 618L provides the left detector signal to an amplifier 622L, such as an operational amplifier, via a low pass filter (LPF) 620L.

In various embodiments, the LPF 620L is configured to pass frequencies within the left detector signal below a cut off frequency and suppress frequencies within the left detector signal above the cut off frequency. For example, in the illustrated embodiment, the LPF 620L is used to filter out high frequency noise in the left detector signal. In various embodiments, the cut off frequency of the LPF 620L is substantially equal to or less than 10% of a radar frequency of interest. In an example embodiment, the cut off frequency of the LPF 620L is substantially equal to 3.5% of radar frequency of interest. In an example embodiment, the radar frequency of interest is a central, bounding (e.g., upper bound or lower bound), or characteristic frequency of a frequency waveband of interest (e.g., the radar band(s) that the instance of receiving circuitry 640L is configured to operate at). For example, in an example embodiment, instance of receiving circuitry 640L is configured to operate in the UHF-band (having a central frequency of approximately 400 MHz) and the cut off frequency is less than 40 MHz (e.g., approximately 14 MHz). In various embodiments, the cut off frequency of the LPF 620L may be influenced by various factors, such as the radar pulse width.

Based on an output of the low pass filter 620L and the output of the amplifier 622L, left-hand polarized component frequency and/or phase information is provided to the computational circuitry. For example, a left-hand polarized component frequency and/or frequency profile/spectrum and phase and/or phase profile may be determined (e.g., by the frequency and phase detector 618L, and/or the like) and provided as left-hand polarized component frequency and/or phase information. For example, the determined frequency and/or phase information (and/or an electrical signal indicative thereof) may be provided to computational circuitry of the radar cloaking apparatus 600 for use in determining one or more predicted reflection signatures (e.g., with each predicted reflection signature corresponding to a scattering element of a model trained to define a scattering element representation of the radar target).

At least a portion of the output of the amplifier 622L is provided to a fast analog delay element 626L. The left delay signal is also provided to the fast analog delay element 626L. In various embodiments, the fast analog delay element 626L is configured to introduce a variable length delay into the received signal such that the signal output by the fast analog delay element 626L is delayed (e.g., is shifted in phase) by a variable delay with respect to the signal received by the fast analog delay element. The delayed signal output by the fast analog delay element 626L is provided to a splitter 630L. In the illustrated embodiment, the splitter 630L is a 1:2 splitter. For example, the splitter 630L splits the delayed signal output by the fast analog delay element 626L into a loop signal and a left extracted information signal. The loop signal is passed to a phase locked loop 628L. The phased locked loop 628L is configured to provide phase locked feedback to the frequency phase detector 618L and/or the extracted information signal.

The right receiving circuitry 640R of the radar cloaking apparatus 600 is similar to the left receiving circuitry 640L, but receives an input electrical signal from the right receiving antenna 614R. For example, the right receiving circuitry 640R of the radar cloaking apparatus 600 is configured such that an electrical signal generated by a radio signal, an interrogating radar signal, and/or the like and/or the right-hand polarized component thereof being incident on the right receiving antenna 614R is filtered by a bandpass filter 602R.

In various embodiments, the frequency range or band passed by the bandpass filter 602R is the operational frequency range of the corresponding instance of right receiving circuitry 640R. For example, in an example embodiment where the right receiving circuitry 640R is configured to operate at a single radar band (e.g., the HF-band, the VHF-band, the UHF-band, the L-band, C-band, S-band, or X-band), the bandpass filter 602R is configured to pass the corresponding frequency range. For example, for an instance of right receiving circuitry 640R configured to operate at the UHF-band, the central frequency of the band passed by the bandpass filter 602R is approximately 40 MHz. Moreover, the band passed by the bandpass filter 602R has a bandwidth of approximately 10% of the central frequency of the band, in an example embodiment. Thus, in the example of the right receiving circuitry 640R operating at the UHF-band, the bandpass filter 602R is configured to pass the frequency band 380-420 MHz, in an example embodiment. For example, in an example embodiment where the right receiving circuitry 640R is configured to operate at a group of radar bands (e.g., the HF-band, the VHF-band, and the UHF-band; or the L-band, C-band, S-band, and X-band), the bandpass filter 602R is configured to pass the corresponding frequency range. For example, in an example embodiment where the right receiving circuitry 640R is configured to operate at the entire frequency operating range of the radar cloaking apparatus 600 (e.g., the HF-band, the VHF-band, the UHF-band, the L-band, C-band, S-band, and X-band), the bandpass filter 602R is configured to pass the corresponding frequency range.

The filtered signal is provided to an amplifier 604R, such as a low noise amplifier, configured to amplify the filtered signal without introducing a significant amount of noise to the resulting amplified signal. The amplified signal is provided to a splitter 606R, such as a 1:2 splitter, configured to split the amplified signal into a first right signal and a second right signal. The first right signal is provided to voltage detector 610R which monitors the voltage across variable resistor 608R to determine a voltage and/or amplitude of the second right signal. For example, the determined voltage and/or amplitude of the second right signal (and/or an electrical signal indicative thereof) may be provided to computational circuitry of the radar cloaking apparatus 600. In various embodiments, the voltage and/or amplitude of the second right signal may be used to determine the ratio of the power and/or energy in the left-hand polarized and the right-hand polarized components of the interrogating radar signals, determine the total power and/or amplitude of the interrogating radar signal, and/or the like. The second right signal is provided to the variable resistor 608R. The variable resistor 608R is configured to provide the second right signal to a splitter 616R.

In various embodiments, the splitter 616R is a 1:2 splitter. For example, the splitter 616R is configured to split the second right signal into a right detector signal and a right delay signal. The right detector signal is provided to a frequency and phase detector 618R configured to detect the frequency and phase of the right detector signal. The frequency and phase detector 618R provides the right detector signal to an amplifier 622R, such as an operational amplifier, via a LPF 620R.

In various embodiments, the LPF 620R is configured to pass frequencies within the right detector signal below a cut off frequency and suppress frequencies within the right detector signal above the cut off frequency. For example, the LPF 620R is configured to filter high frequency noise out of the right detector signal. In various embodiments, the cut off frequency of the LPF 620R is substantially equal to or less than 10% of a radar frequency of interest. In an example embodiment, the cut off frequency of the LPF 620R is substantially equal to 3.5% of radar frequency of interest. In an example embodiment, the radar frequency of interest is a central, bounding (e.g., upper bound or lower bound), or characteristic frequency of a frequency waveband of interest (e.g., the radar band(s) that the instance of receiving circuitry 640R is configured to operate at). For example, in an example embodiment, instance of receiving circuitry 640R is configured to operate in the UHF-band (having a central frequency of approximately 400 MHz) and the cut off frequency is less than 40 MHz (e.g., approximately 14 MHz). In various embodiments, the cut off frequency of the LPF 620R may be influenced by various factors, such as the radar pulse width.

Based on an output of the low pass filter 620R and the output of the amplifier 622R, frequency and/or phase information may be provided. For example, a right-hand polarized component frequency and/or frequency profile/spectrum and phase and/or phase profile is determined (e.g., by the frequency and phase detector 618R, and/or the like) and provided as frequency and/or phase information. For example, the determined frequency and/or phase information (and/or an electrical signal indicative thereof) is provided to computational circuitry of the radar cloaking apparatus 600.

At least a portion of the output of the amplifier 622R is provided to a fast analog delay element 626R. The right delay signal is also provided to the fast analog delay element 626R. In various embodiments, the fast analog delay element 626R is configured to introduce a variable length delay into the received signal such that the signal output by the fast analog delay element 626R is delayed (e.g., shifted in phase) by a variable delay with respect to the signal received by the fast analog delay element. The delayed signal output by the fast analog delay element 626R is provided to a splitter 630R. In the illustrated embodiment, the splitter 630R is a 1:2 splitter. For example, the splitter 630R splits the delayed signal output by the fast analog delay element 626R into a loop signal and a right extracted information signal. The loop signal is passed to a phase locked loop 628R. The phased locked loop 628R is configured to provide phase locked feedback to the frequency phase detector 618R and/or the right extracted information signal.

In various embodiments, the radar cloaking apparatus 600 comprises left emitting circuitry 645L and right emitting circuitry 645R. In various embodiments, the left emitting circuitry 645L is configured to receive at least a portion of both the left extracted information signal and the right extracted information signal and, based at least in part on the at least a portion of both the left extracted information signal and the right extracted information signal and the model encoding scattering properties of the radar target (e.g., a model defining a scattering element representation of the radar target), cause the left emitting antenna 612L to emit a left-hand polarized component of the cloaking radio signal. For example, based on the model encoding scattering properties of the radar target (e.g., a model defining a scattering element representation of the radar target), a left-hand polarized component of the predicted reflection signature for the radar target may be determined.

For example, based on the model encoding scattering properties of the radar target (e.g., a model defining a scattering element representation of the radar target), the voltage and/or amplitude of the second left signal, and/or the left-hand polarized component frequency and/or phase information, a first portion of a left-hand polarized component of the predicted reflection signature is determined. In an example embodiment, the first portion of the left-hand polarized component of the predicted reflection signature comprises a frequency profile/spectrum, phase, and/or amplitude prediction of a left-hand polarized component of the reflection signal generated by the left-hand polarized component of the interrogating radio signal scattering and/or reflecting off of the corresponding radar target. Similarly, based on the model encoding scattering properties of the radar target (e.g., a model defining a scattering element representation of the radar target), the voltage and/or amplitude of the second right signal, and/or the right-hand polarized component frequency and/or phase information, a second portion of the left-hand polarized component of the predicted reflection signature is determined. In an example embodiment, the second portion of the left-hand polarized component of the predicted reflection signature comprises a frequency profile/spectrum, phase, and/or amplitude prediction of a left-hand polarized component of the reflection signal generated by the right-hand polarized component of the interrogating radio signal scattering and/or reflecting off of the corresponding radar target.

The first and second portions of the left-hand polarized component of the predicted reflection signature are combined, superpositioned, and/or added together to provide the left-hand polarized component of the predicted reflection signature. The left-hand polarized component of the cloaking radio signal emitted by the left emitting antenna 612L is generated based on the left-hand polarized component of the predicted reflection signature.

In various embodiments, the right emitting circuitry 645R is configured to receive at least a portion of both the left extracted information signal and the right extracted information signal and, based at least in part on the at least a portion of both the left extracted information signal and the right extracted information signal and the model encoding scattering properties of the radar target (e.g., a model defining a scattering element representation of the radar target), cause the right emitting antenna 612R to emit a right-hand polarized component of the cloaking radio signal. For example, based on the model encoding scattering properties of the radar target (e.g., a model defining a scattering element representation of the radar target), a right-hand polarized component of the predicted reflection signature for the radar target may be determined.

For example, based on the model encoding scattering properties of the radar target (e.g., a model defining a scattering element representation of the radar target), the voltage and/or amplitude of the second right signal, and/or the right-hand polarized component frequency and/or phase information, a first portion of a right-hand polarized component of the predicted reflection signature is determined. In an example embodiment, the first portion of the right-hand polarized component of the predicted reflection signature comprises a frequency profile/spectrum, phase, and/or amplitude prediction of a right-hand polarized component of the reflection signal generated by the right-hand polarized component of the interrogating radio signal scattering and/or reflecting off of the corresponding radar target. Similarly, based on the model encoding scattering properties of the radar target (e.g., a model defining a scattering element representation of the radar target), the voltage and/or amplitude of the second left signal, and/or the left-hand polarized component frequency and/or phase information, a second portion of the right-hand polarized component of the predicted reflection signature is determined. In an example embodiment, the second portion of the right-hand polarized component of the predicted reflection signature comprises a frequency profile/spectrum, phase, and/or amplitude prediction of a right-hand polarized component of the reflection signal generated by the left-hand polarized component of the interrogating radio signal scattering and/or reflecting off of the corresponding radar target.

The first and second portions of the right-hand polarized component of the predicted reflection signature are combined, superpositioned, and/or added together to provide the right-hand polarized component of the predicted reflection signature. The right-hand polarized component of the cloaking radio signal emitted by the right emitting antenna 612R is generated based on the right-hand polarized component of the predicted reflection signature.

In various embodiments, the superposition and/or interference of the right-hand polarized component of the cloaking radio signal and the left-hand polarized component of the cloaking radio signal with one another provides the cloaking radio signal. In various embodiments, the cloaking radio signal is configured to cloak (e.g., minimize and/or reduce through destructive interference) a reflected radar signal generated by an interrogating radar signal scattering and/or reflecting off of the radar target. In an example embodiment, the cloaking radio signal is configured to cloak (e.g., minimize and/or reduce through destructive interference) a reflected radar signal generated by an interrogating radar signal scattering and/or reflecting off of the corresponding radar target within a field-of-view and/or from the perspective of a radar system that generated, transmitted, and/or broadcasted the interrogating radar signal (e.g., along a line-of-sight corresponding to the interrogation angle of the interrogating radar signal).

In the illustrated embodiment, the splitter 630L of the left receiving circuitry 640R provides the left extracted information signal to another splitter 632L, such as a 1:2 splitter. The splitter 632L splits the left extracted information signal into a first left extracted information signal and the second left extracted information signal. The first left extracted information signal is provided to the right emitting circuitry 645R and the second left extracted information signal is provided to the left emitting circuitry 645L.

Similarly, the splitter 630R of the right receiving circuitry 640R provides the right extracted information signal to another splitter 632R, such as a 1:2 splitter. The splitter 632R splits the right extracted information signal into a first right extracted information signal and the second right extracted information signal. The first right extracted information signal is provided to the right emitting circuitry 645R and the second right extracted information signal is provided to the left emitting circuitry 645L.

In the illustrated embodiment, the computational circuitry of the radar cloaking apparatus 600 determines a (aggregated) predicted reflection signature 650 for the corresponding radar target. The left and/or right emitting circuitry 645L, 645R are controlled by the computational circuitry to cause the left and/or right emitting antennas 612L, 612R to emit a cloaking radio signal that approximates the (aggregated) predicted reflection signature 650 that is shifted in phase and/or has a controlled phase difference and/or offset with respect to the reflected signal generated by the interrogating radar signal scattering and/or reflecting off of the radar target.

In various embodiments, the right emitting circuitry 645R receives the first left extracted information signal at a LR delay element 634LR. In various embodiments, the computational circuitry of the radar cloaking apparatus 600 generates and provides a control signal (e.g., based on the predicted reflection signature 650 determined based on the model encoding scattering properties of the radar target (e.g., a model defining a scattering element representation of the radar target)) to the LR delay element 634LR. The LR delay element 634LR is configured to, based at least in part on the control signal), introduce and/or cause a delay (e.g., shift in phase) in the first left extracted information signal with respect to the right-hand polarized component of the reflection signal generated by the left-hand polarized component of the interrogating radar signal scattering and/or reflecting off of the corresponding radar target. For example, the delay introduced and/or caused in the first left extracted information signal may be configured such that a portion of the right-hand polarized component of the cloaking radio signal (e.g., emitted by the right emitting antenna 612R and corresponding to the right-hand polarized component of the reflection signal generated by the left-hand polarized component of the interrogating radar signal scattering and/or reflecting off of the radar target) is shifted in phase (e.g., by 120-240 degrees, 135-225 degrees, 150-210 degrees, 170-190 degrees, 175-185 degrees, and/or approximately 180 degrees out of phase, according to various embodiments) with respect to the right-hand polarized component of the reflection signal generated by the left-hand polarized component of the interrogating radar signal scattering and/or reflecting off of the corresponding radar target.

The delayed first left extracted information signal output by the LR delay element 634LR may be provided to an LR amplifier 636LR. For example, the LR amplifier 636LR may be an operational amplifier, variable and/or configurable amplifier, and/or the like. For example, the LR amplifier 636LR may be configured to, based in part on the predicted reflection signature 650, adjust, modulate, increase and/or the like the amplitude of the delayed first left extracted information signal. For example, the amplitude of the delayed first left extracted information signal may be adjusted, modulated, increased, and/or the like to match and/or approximate the amplitude of the right-hand polarized component of the reflection signal generated by the left-hand polarized component of the interrogating radar signal scattering and/or reflecting off of the corresponding radar target, as determined based on the (aggregated) predicted reflection signature 650. The amplitude-adjusted delayed first left extracted information signal may be provided to multiplexer and/or combiner element 638R.

In various embodiments, the right emitting circuitry 645R receives the first right extracted information signal at a RR delay element 634RR. In various embodiments, the computational circuitry of the radar cloaking apparatus 600 generates and provides a control signal (e.g., based on the predicted reflection signature 650 determined based on the model encoding scattering properties of the radar target (e.g., a model defining a scattering element representation of the radar target)) to the RR delay element 634RR. The RR delay element 634RR is configured to, based at least in part on the control signal), introduce and/or cause a delay (e.g., shift in phase) in the first right extracted information signal with respect to the right-hand polarized component of the reflection signal generated by the right-hand polarized component of the interrogating radar signal scattering and/or reflecting off of the corresponding radar target. For example, the delay introduced and/or caused in the first right extracted information signal may be configured such that a portion of the right-hand polarized component of the cloaking radio signal (e.g., emitted by the right emitting antenna 612R and corresponding to the right-hand polarized component of the reflection signal generated by the right-hand polarized component of the interrogating radar signal scattering and/or reflecting off of the radar target) is shifted in phase (e.g., by 120-240 degrees, 135-225 degrees, 150-210 degrees, 170-190 degrees, 175-185 degrees, and/or approximately 180 degrees out of phase, according to various embodiments) with respect to the right-hand polarized component of the reflection signal generated by the right-hand polarized component of the interrogating radar signal scattering and/or reflecting off of the corresponding radar target.

The delayed first right extracted information signal output by the RR delay element 634RR may be provided to an RR amplifier 636RR. For example, the RR amplifier 636RR may be an operational amplifier, variable and/or configurable amplifier, and/or the like. For example, the RR amplifier 636RR may be configured to, based in part on the (aggregated) predicted reflection signature 650, adjust, modulate, increase and/or the like the amplitude of the delayed first right extracted information signal. For example, the amplitude of the delayed first right extracted information signal may be adjusted, modulated, increased, and/or the like to match and/or approximate the amplitude of the right-hand polarized component of the reflection signal generated by the right-hand polarized component of the interrogating radar signal scattering and/or reflecting off of the corresponding radar target, as determined based on the (aggregated) predicted reflection signature 650. The amplitude-adjusted delayed first right extracted information signal may be provided to multiplexer and/or combiner element 638R.

In various embodiments, the multiplexer and/or combiner element 638R combines the amplitude-adjusted delayed first right extracted information signal and the amplitude-adjusted delayed first left extracted information signal into a right-hand polarized conditioned electrical signal. In various embodiments, the right-hand polarized conditioned electrical signal corresponds to the total right-hand polarized reflection signature generated by the interrogating radar signal scattering and/or reflecting off of the corresponding radar target as determined based on the model encoding the scattering properties of the radar target (e.g., a model defining a scattering element representation of the radar target).

The right-hand polarized conditioned electrical signal is provided to the right emitting antenna 612R such that the right emitting antenna 612R emits the right-hand polarized component of the cloaking radio signal. In various embodiments, the right-hand polarized component of the cloaking radio signal is generated responsive to the detection of the interrogating radar signal by the left and/or right receiving antenna 614L, 614R.

In various embodiments, the right-hand polarized component of the cloaking radio signal is configured to be shifted in phase (e.g., by 120-240 degrees, 135-225 degrees, 150-210 degrees, 170-190 degrees, 175-185 degrees, and/or approximately 180 degrees out of phase, according to various embodiments) with respect to the right-hand polarized component of the reflection signal generated by the interrogating radar signal scattering and/or reflecting off of the corresponding radar target. For example, the emission of the right-hand component of the cloaking radio signal may be delayed from the time the interrogating radar signal is incident on the corresponding radar target such that the right-hand component of the cloaking radio signal is shifted in phase (e.g., by 120-240 degrees, 135-225 degrees, 150-210 degrees, 170-190 degrees, 175-185 degrees, and/or approximately 180 degrees out of phase, according to various embodiments) with the right-hand polarized component of the reflection signal generated by the interrogating radar signal scattering and/or reflecting off of the corresponding radar target. Thus, the superposition of the right-hand polarized component of the reflection signature generated by the interrogating radar signal off of the corresponding radar target and the right-hand component of the cloaking radio signal is a minimized and/or reduced signal (e.g., with an amplitude of approximately zero).

In various embodiments, the left emitting circuitry 645L receives the second left extracted information signal at a LL delay element 634LL. In various embodiments, the computational circuitry of the radar cloaking apparatus 600 generates and provides a control signal (e.g., based on the predicted reflection signature 650 determined based on the model encoding scattering properties of the radar target (e.g., a model defining a scattering element representation of the radar target)) to the LL delay element 634LL. The LL delay element 634LL is configured to, based at least in part on the control signal), introduce and/or cause a delay (e.g., shift in phase) in the second left extracted information signal with respect to the left-hand polarized component of the reflection signal generated by the left-hand polarized component of the interrogating radar signal scattering and/or reflecting off of the corresponding radar target. For example, the delay introduced and/or caused in the second left extracted information signal may be configured such that a portion of the left-hand polarized component of the cloaking radio signal (e.g., emitted by the left emitting antenna 612L and corresponding to the left-hand polarized component of the reflection signal generated by the left-hand polarized component of the interrogating radar signal scattering and/or reflecting off of the radar target) is shifted in phase (e.g., by 120-240 degrees, 135-225 degrees, 150-210 degrees, 170-190 degrees, 175-185 degrees, and/or approximately 180 degrees out of phase, according to various embodiments) with respect to the left-hand polarized component of the reflection signal generated by the left-hand polarized component of the interrogating radar signal reflecting off of the corresponding radar target.

The delayed second left extracted information signal output by the LL delay element 634LL may be provided to an LL amplifier 636LL. For example, the LL amplifier 636LL may be an operational amplifier, variable and/or configurable amplifier, and/or the like. For example, the LL amplifier 636LL may be configured to, based in part on the (aggregated) predicted reflection signature 650, adjust, modulate, increase and/or the like the amplitude of the delayed second left extracted information signal. For example, the amplitude of the delayed second left extracted information signal may be adjusted, modulated, increased, and/or the like to match and/or approximate the amplitude of the left-hand polarized component of the reflection signal generated by the left-hand polarized component of the interrogating radar signal scattering and/or reflecting off of the radar target, as determined based on the predicted reflection signature 650. The amplitude-adjusted delayed second left extracted information signal may be provided to multiplexer and/or combiner element 638L.

In various embodiments, the left emitting circuitry 645L receives the second right extracted information signal at a RL delay element 634RL. In various embodiments, the computational circuitry of the radar cloaking apparatus 600 generates and provides a control signal (e.g., based on the predicted reflection signature 650 determined based on the model encoding scattering properties of the radar target (e.g., a model defining a scattering element representation of the radar target)) to the RL delay element 634RL. The RL delay element 634RL is configured to, based at least in part on the control signal), introduce and/or cause a delay (e.g., shift in phase) in the second right extracted information signal with respect to the left-hand polarized component of the reflection signal generated by the right-hand polarized component of the interrogating radar signal scattering and/or reflecting off of the corresponding radar target. For example, the delay introduced and/or caused in the second right extracted information signal may be configured such that a portion of the left-hand polarized component of the cloaking radio signal (e.g., emitted by the left emitting antenna 612L and corresponding to the left-hand polarized component of the reflection signal generated by the right-hand polarized component of the interrogating radar signal scattering and/or reflecting off of the radar target) is shifted in phase (e.g., by 120-240 degrees, 135-225 degrees, 150-210 degrees, 170-190 degrees, 175-185 degrees, and/or approximately 180 degrees out of phase, according to various embodiments) with respect to the left-hand polarized component of the reflection signal generated by the right-hand polarized component of the interrogating radar signal scattering and/or reflecting off of the corresponding radar target.

The delayed second right extracted information signal output by the RR delay element 634RR may be provided to an RR amplifier 636RR. For example, the RL amplifier 636RL may be an operational amplifier, variable and/or configurable amplifier, and/or the like. For example, the RL amplifier 636RL may be configured to, based in part on the predicted reflection signature 650, adjust, modulate, increase and/or the like the amplitude of the delayed second right extracted information signal. For example, the amplitude of the delayed second right extracted information signal may be adjusted, modulated, increased, and/or the like to match and/or approximate the amplitude of the reflection signal generated by the right-hand polarized component of the interrogating radar signal scattering and/or reflecting off of the corresponding radar target, as determined based on the (aggregated) predicted reflection signature 650. The amplitude-adjusted delayed second right extracted information signal may be provided to multiplexer and/or combiner element 638L.

In various embodiments, the multiplexer and/or combiner element 638L combines the amplitude-adjusted delayed second right extracted information signal and the amplitude-adjusted delayed second left extracted information signal into a left-hand polarized conditioned electrical signal. In various embodiments, the left-hand polarized conditioned electrical signal corresponds to the total left-hand polarized reflection signature generated by the interrogating radar signal reflecting off of the corresponding radar target as determined based on the model encoding the scattering properties of the radar target (e.g., a model defining a scattering element representation of the radar target). The left-hand polarized conditioned electrical signal is provided to the left emitting antenna 612R such that the left emitting antenna 612R emits the left-hand polarized component of the cloaking radio signal. In various embodiments, the left-hand polarized component of the cloaking radio signal is generated responsive to the detection of the interrogating radar signal by the left and/or right receiving antenna 614L, 614R.

In various embodiments, the left-hand polarized component of the cloaking radio signal is configured to be shifted in phase (e.g., by 120-240 degrees, 135-225 degrees, 150-210 degrees, 170-190 degrees, 175-185 degrees, and/or approximately 180 degrees out of phase, according to various embodiments) with the left-hand polarized component of the reflection signature generated by the interrogating radar signal off of the corresponding radar target. For example, the emission of the left-hand component of the cloaking radio signal may be delayed from the time the interrogating radar signal is incident on the corresponding radar target such that the left-hand component of the cloaking radio signal is shifted in phase (e.g., by 120-240 degrees, 135-225 degrees, 150-210 degrees, 170-190 degrees, 175-185 degrees, and/or approximately 180 degrees out of phase, according to various embodiments) with the left-hand polarized component of the reflection signature generated by the interrogating radar signal scattering and/or reflecting off of the corresponding radar target. Thus, the superposition of the left-hand polarized component of the reflection signature generated by the interrogating radar signal off of the corresponding radar target and the left-hand component of the cloaking radio signal is a minimized and/or reduced signal (e.g., with an amplitude of approximately zero).

Example Operation of a Radar Cloaking Apparatus

Figure 7:
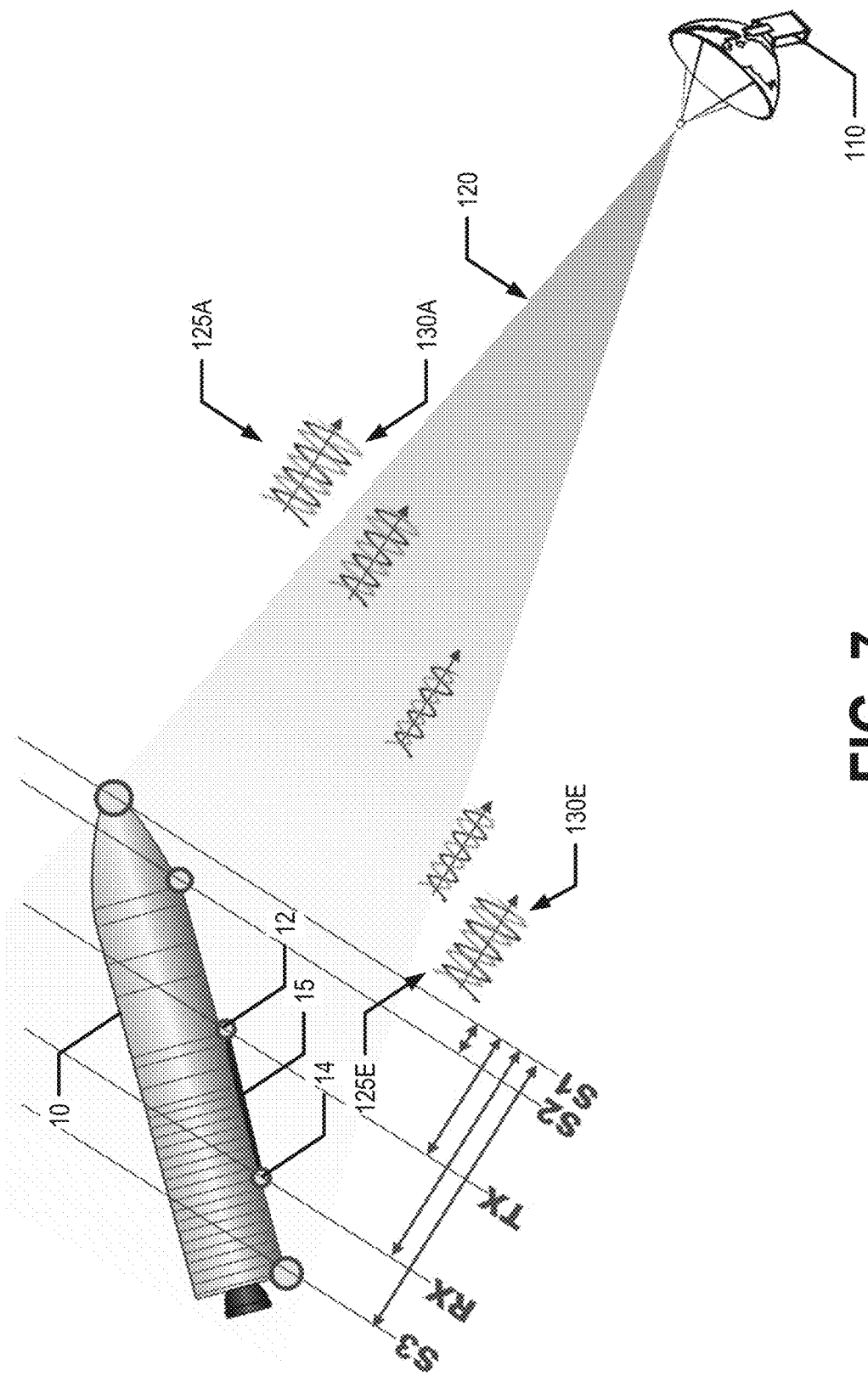
FIG. 7 is a concept diagram illustrating the effect of the cloaking radio signal, in accordance with an example embodiment.

FIG. 7 provides a schematic diagram of the operation of a radar cloaking apparatus 15 that is physically coupled to and/or associated with a radar target 10. In an example embodiment, the radar cloaking apparatus 15 is a sub-assembly of the radar target 10. In various embodiments, the computational circuitry of the radar cloaking apparatus 15 stores and/or has access to a model encoding the scattering properties of the radar target 10 to which the radar cloaking apparatus 15 is physically coupled to and/or associated with. In an example embodiment, the model encoding scattering properties of the radar target 10 is a model trained to define a scattering element representation of the radar target 10. In an example embodiment, the model encoding scattering properties of the radar target 10 and information determined based thereon and usable to determine a (aggregated) predicted reflection signature for the radar target 10 is stored by and/or accessible to the computational circuitry of the radar cloaking apparatus 15 as, for example, a look up table. In various embodiments, the model encoding scattering properties of the radar target and information determined based thereon and usable to determine a (aggregated) predicted reflection signature for the radar target 10 is stored by and/or accessible to the computational circuitry of the radar cloaking apparatus 15 may be stored in a variety of formats as appropriate for the configuration of the computational circuitry of the radar cloaking apparatus 15 of the embodiment and expected dynamic time constraints of the application.

In various embodiments, the radar cloaking apparatus is configured to detect an interrogating radar signal via receiving antenna 14. For example, a radar system 110 transmits and/or broadcast an interrogating radar signal 120. The receiving antenna 14 detects the interrogating radar signal. Responsive to detecting the interrogating radar signal 120, the computational circuitry of the radar cloaking apparatus 15 causes a cloaking radio signal (e.g., a superposition of predicted reflection signatures 130A-E each shifted in phase with respect to the corresponding reflected signals 125A-E by 120-240 degrees, 135-225 degrees, 150-210 degrees, 170-190 degrees, 175-185 degrees, and/or approximately 180 degrees out of phase, according to various embodiments) to be emitted by a transmitting antenna such as emitting antenna 12. In various embodiments, the cloaking radio signal is a (aggregated) predicted reflection signature of the radar target 10 that is expected and/or configured to approximate the superposition of reflected signals 125A-E generated by the interrogating radar signal 120 scattering and/or reflecting off of the radar target 10 with the phase of the emitted cloaking radio signal being out of phase (e.g., shifted in phase by 120-240 degrees, 135-225 degrees, 150-210 degrees, 170-190 degrees, 175-185 degrees, and/or approximately 180 degrees out of phase, according to various embodiments) with the corresponding reflected signal. Due to the phase difference between the emitted cloaking radio signal and the reflected signal, destructive interference between the emitted cloaking radio signal and the reflected signal reduces and/or minimizes (e.g., to approximately zero) the reflected signal detected by an interrogating radar system 110. As should be understood, the interrogating radar system may be a monostatic radar system, bistatic radar system, and/or multistatic radar system.

In various embodiments wherein the model configured to encode the scattering properties of the radar target 10 is a model trained to define a scattering element representation of the radar target 10, an aggregated predicted reflection signature is determined. The aggregated predicted reflection signature is the superposition of predicted reflected signatures generated and/or determined for each scattering element of the scattering element representation of the radar target 10. For example, the predicted reflection signature may be the model predicted reflection signal of an interrogating radar signal scattering and/or reflecting off of a scattering feature of the radar target 10 corresponding to a scattering element of the scattering element representation of the radar target 10.

For example, each scattering feature S1, S2, S3, RX, TX of the radar target 10 may scatter and/or reflect the interrogating signal to generate corresponding reflected signals 125A-E. Based on a respective one of the scattering elements of the model trained to define a scattering element representation of the radar target, a predicted reflection signature approximating the reflected signal generated by the interrogating signal scattering and/or reflecting off of a corresponding scattering feature of the radar target is determined. The aggregated predicted reflection signature is an aggregation and/or superposition of the predicted reflection signatures that are appropriately shifted in phase with respect to one another such that the emitted cloaking radar signal is a superposition of cloaking radar signal portions 130A-E that each correspond to a scattering element of the scattering element representation of the radar target 10. Each of the cloaking radar signal portions 130A-E are shifted in phase (e.g., by 120-240 degrees, 135-225 degrees, 150-210 degrees, 170-190 degrees, 175-185 degrees, and/or approximately 180 degrees out of phase, according to various embodiments) with respect to the corresponding scattering feature reflected signal 125A-E.

Thus, the reflected signal corresponding to each scattering feature of the radar target 10 may be decreased and/or minimized through interaction of the reflected signal 125A-E and the corresponding cloaking radar signal portion 130A-E. In other words, the cloaking radar signal may comprise a cloaking radar signal portion 130A configured to destructively interfere with reflected signal 125A generated by the scattering and/or reflecting of the interrogating signal 120 off of a first scattering feature S1. Additionally, the cloaking radar signal may comprise cloaking radar signal portions 130B, 130C, 130D, 130E each configured to destructively interfere with a respective reflected signal 125B, 125C, 125D, 125E corresponding to the scattering and/or reflecting of the interrogating signal 120 off of a second scattering feature S2, emitting antenna 12, receiving antenna 14, and third scattering feature S3, respectively. As should be understood, the scattering element representation of the radar target 10 may comprise an appropriate number of scattering elements for modeling the particular radar target 10, in various embodiments, and the use of five scattering elements to describe radar target 10 shown in FIG. 7 is merely an illustrative example.

FIG. 8 provides a flowchart illustrating operation of the computational circuitry of an example embodiment of a radar cloaking apparatus to emit a cloaking radio signal. Starting at step/operation 802, an interrogating radar signal is detected. For example, while the radar target is located and/or traveling through an area within the range of a radar system (e.g., radar system 110), the radar system transmits and/or broadcasts an interrogating radar signal in an attempt to detect and/or identify radar targets located within the range of the radar system. The interrogating radar signal is incident on the receiving antenna of the radar cloaking apparatus, causing an electrical signal indicative of and/or corresponding to the interrogating radar signal to be generated within the radar cloaking apparatus. At least a portion of the electrical signal and/or information extracted therefrom (e.g., voltage and/or amplitude, frequency and/or phase information) is provided to the computational circuitry of the radar cloaking apparatus (possibly via receiving circuitry 540, 640L, 640R of the radar cloaking apparatus). For example, in the illustrated embodiments of FIGS. 5 and 6, the receiving circuitry 540, 640L, 640R receives the electrical signal generated by the interrogating radar signal being incident on the receiving antenna, extracts information from the electrical signal (e.g., voltage and/or amplitude, frequency and/or phase information), and provides the extracted information to the computational circuitry. The computational circuitry then determines and/or detects that an interrogating radar signal is incident on the radar target responsive to receiving the electrical signal and/or information extracted therefrom.

In various embodiments, the computational circuitry analyzes frequency information (e.g., a frequency profile and/or spectrum) extracted from the electrical signal to determine whether the electrical signal was generated by a radar system. For example, the computational circuitry determines whether the frequency profile and/or spectrum extracted from the electrical signal is in a radar band (e.g., HF-band, UHF-band, VHF-band, L-band, S-band, C-band, X-band, Ku-band, K-band, Ka-band). In an example embodiment, based on a location of the radar target (e.g., determined by one or more positioning features of the radar target and/or radar cloaking apparatus, movement/flight plan for the radar target, and/or the like) the computational circuitry may determine if the radar target is within range of a radar system known to operate in the radar band corresponding to the frequency profile and/or spectrum extracted from the electrical signal generated by the interrogating radar signal being incident on the receiving antenna.

At step/operation 804, the interrogation angle (e.g., the angle of incidence of the interrogating radar signal on the radar target) is determined, in an example embodiment. In various embodiments, the interrogation angle is equivalent to the angle formed between an interrogator direction (e.g., a line drawn from the radar system that transmitted and/or broadcasted the interrogating radar signal to the radar target) with respect to a reference line or plane (e.g., a vertical line at the location of the radar target, an axis of the radar target, and/or the like). In an example embodiment, the interrogation angle is one or more angles of a spherical coordinate system centered on the radar target that describe a line in the spherical coordinate system between the origin of the coordinate system (e.g., a center of the radar target, a point on the surface of the radar target, and/or other point on/in the radar target) and the radar system that transmitted and/or broadcasted the interrogating radar signal.

For example, in an example embodiment, the computational circuitry of the radar cloaking apparatus determines an interrogation angle based on the detected interrogating radar signal. In an example embodiment, the radar cloaking apparatus comprises and/or is in communication with two or more (e.g., a plurality) of antennas that are physically associated with the radar target. In one such embodiment, the interrogation angle is determined based on a relative timing and/or relative phase of the interrogating radar signal when the interrogating radar signal is incident on each antenna. In an example embodiment, the interrogation angle is determined based on a priori information such as a known location of a known radar system in the vicinity of the radar target (e.g., where the radar target is located within the range of the known radar system) and the location of the radar target. In an example embodiment, the interrogation angle is determined based on known or expected beam characteristics of the detected interrogating radar signal and known characteristics of radar systems known and/or suspected of being located in the vicinity of the radar target (e.g., where the radar target is located within the range of the known radar system).

In various embodiments, a roll and/or pitch angle of radar target is also determined. In various embodiments, the computational circuitry of the radar cloaking apparatus is in communication with one or more gyroscopes and/or the like onboard the radar target that are respectively configured to generate a respective signal that may be used to determine a roll and/or pitch angle of the radar target. A viewing angle corresponding to and/or indicating the orientation of the radar target with respect to the interrogating radar signal may therefore be determined based on the interrogation angle and the roll and/or pitch angle of the radar target.

At step/operation 806, the status of an adjustable component of the radar target is determined in an example embodiment. For example, in scenarios where the radar target comprises one or more adjustable components (e.g., fins, wing flaps, ailerons, rudders, elevators, trim tabs, stabilizers, and/or other components) that are adjustable or moveable between two or more positions, the scattering properties of the radar target may change when the adjustable component is adjusted between a first position and a second position (e.g., from an unactuated position to an actuated position, or vice versa, for example). For example, in an example embodiment, the computational circuitry of the radar cloaking apparatus determines the target adjustment status of one or more adjustable components of the radar target, wherein the target adjustment status of an adjustable component provides an indication of which position the adjustable component is in. For example, in an example embodiment, the radar cloaking apparatus monitors one or more switches, actuators, and/or the like of the radar target to determine whether the switch, actuator and/or the like configured to control the position of an adjustable component is actuated, unactuated, and/or the like. For example, in an example embodiment, the computational circuitry of the radar cloaking apparatus is in communication with a controller of the radar target and the computational circuitry submits a polling message such that the controller responds to the polling message with an indication of the target adjustment status of the one or more adjustable components of the radar target. In yet another example, in an example embodiment, the computational circuitry of the radar cloaking apparatus is programmed and/or configured to determine the target adjustment status of one or more adjustable components of the radar target based on timing and/or location information (e.g., time in flight, time until destination, location along movement/flight plan, distance traveled, distance to destination, altitude, and/or the like), movement information (e.g., travel speed, travel direction/heading, acceleration, change in altitude, and/or the like), a movement/flight plan being traversed by the radar target, and/or the like to infer a status for each of one or more adjustable components of the radar target.

In an example embodiment, the model encoding scattering properties of the radar target (e.g., a model trained to define a scattering element representation of the radar target) corresponding to the radar target and referenced at step/operation 808 corresponds to a default target adjustment status of one or more adjustable components of the radar target. For example, the model encodes the scattering properties of the radar target when the one or more adjustable components have default target adjustment statuses corresponding to default positions of the respective adjustable components. In an example embodiment, determining the target adjustment status of an adjustable component of the radar target comprises determining whether the adjustable component of the radar target is in a default position corresponding to the default target adjustment status of the adjustable component. When an adjustable component of the radar target is in a default position corresponding to the default target adjustment status, the adjustable component of the radar target does not introduce any changes to the scattering properties of the radar target as encoded by the model. When an adjustable component of the radar target is in a position other than the default position, corresponding to a target adjustment status other than the default target adjustment status, the adjustable component of the radar target may introduce changes to the scattering properties of the radar target compared to the scattering properties encoded by the model.

At step/operation 808, the computational circuitry of the radar cloaking apparatus references the model encoding scattering properties of the radar target. In various embodiments, the computational circuitry of the radar cloaking apparatus references a model trained to define a scattering element representation of the radar target. In various embodiments, the model encoding scattering properties of the radar target (e.g., the model trained to define a scattering element representation of the radar target) is referenced by referencing a look up table generated based on the model. In various embodiments, the model encoding scattering properties of the radar target (e.g., possibly formatted as a look up table generated based thereon), is stored in memory of the computational circuitry and accessed therefrom, hard-wired into the computational circuitry and referenced therefrom, and/or the like.

At step/operation 810, the computational circuitry determines a predicted reflection signature for the radar target. In various embodiments, the predicted reflection signature for the radar target is determined based on the referenced model encoding scattering properties of the radar target. In various embodiments, the predicted reflection signature is determined by applying reflection theory to the scattering properties of the radar target encoded by the model and the voltage and/or amplitude and/or frequency and/or profile information extracted from the electronic signal generated by the interrogating radar signal being incident on the receiving antenna. For example, in an example embodiment, the computational circuitry determines a predicted reflection signature based on an interrogating radar signal having properties described by the voltage and/or amplitude and/or frequency and/or profile information extracted from the electronic signal generated by the interrogating radar signal being incident on the receiving antenna scattering and/or reflecting off of an object having the scattering properties of the radar target as describe by the model encoding scattering properties of the radar target. In various embodiments, the predicted reflection signature is determined based at least in part on the determined interrogation angle and/or viewing angle. For example, the predicted reflection signature may correspond to the expected reflection signature of the radar target when an interrogating radar signal is scattered and/or reflected off of the radar target from the interrogation angle. In an example embodiment, the predicted reflection signature is determined based at least in part on the determined viewing angle. For example, the surface and/or scattering features of the radar target that the interrogating radar signal interacts with, the orientation of the surface and/or scattering features of the radar target with respect to the interrogating radar signal, and the effects thereof on the predicted reflection signature are determined based on a viewing angle determined based on the roll and/or pitch angle of the radar target when the interrogating radar signal is incident on the radar target in addition to the interrogation angle itself.

In an example embodiment, the referenced model encoding scattering properties of the radar target is a model trained to define a scattering element representation of the radar target. In such an embodiment, a predicted reflection signature for each scattering element of the scattering element representation of the radar target is determined. The predicted reflection signature determined for a scattering element corresponds to an expected and/or predicted reflected signal generated by scattering and/or reflecting an interrogating radar signal having properties described by the voltage and/or amplitude and/or frequency and/or profile information extracted from the electronic signal generated by the interrogating radar signal being incident on the receiving antenna (possibly from the determined interrogation angle) off of the corresponding scattering feature of the radar target when the radar target is at a determined roll and/or pitch angle.

Based on the relative locations associated with the scattering elements (e.g., representing the relative locations of the corresponding scattering features on the radar target), the relative phases of the predicted reflection signatures with respect to one another may be determined. The aggregated predicted reflection signature then be determined by phase-tuning the predicted reflection signatures based on the determined relative phases and aggregating the phase-tuned element predicted reflection signatures. In an example embodiment, the phases of the predicted reflection signatures corresponding to the scattering elements are determined with respect to the relative locations of the scattering elements with respect to the receiving antenna and/or the transmitting and/or emitting antenna. The aggregated predicted reflection signature is then determined by phase-tuning the predicted reflection signatures based on the determined relative phases with respect to the transmitting and/or emitting antenna and aggregating the phase-tuned predicted reflection signatures.

At step/operation 812, the predicted reflection signature is modified based on a determined target adjustment status for one or more adjustable components of the radar target to determine a modified (aggregated) predicted reflection signature. For example, in an example embodiment wherein the respective status of one or more adjustable components of the radar target has been determined, the (aggregated) predicted reflection signature is modified to account for any adjustable components having a determined target adjustment status that is different from the default target adjustment status of the adjustable component in the model encoding scattering properties of the radar target. For example, a modified model may be determined based on the model trained to define a scattering element representation of the radar target, the determined target adjustment status of one or more adjustable components of the radar target, and information/data regarding how the target adjustment status of the one or more adjustable components of the radar target affects the scattering properties of the radar target and/or one or more scattering features of the radar target.

For example, the modified model may be generated by modifying the parameters corresponding to at least one scattering element, adding at least one a scattering element to the parametric model, and/or removing at least one scattering element from the parametric model, wherein the at least one scattering element modified, added, and/or removed corresponds to a change in the scattering features of the radar target due to the determined target adjustment status of the adjustable component being different from the default target adjustment status of the adjustable component. For example, for any adjustable components determined to be in a position other than a default position, corresponding to a target adjustment status other than the default target adjustment status for the respective adjustable component, at least one corresponding scattering element may be modified, removed, and/or added, as appropriate to generate a modified model that encodes the scattering properties of the radar target given the determined target adjustment status of the one or more adjustable components. For example, the modified model defines a modified scattering element representation of the radar target. The modified predicted reflection signature is determined based on the modification of the at least one scattering element, the removed scattering element, and/or the added scattering element corresponding to the target adjustment status of the adjustable component of the radar target.

For example, if parameters corresponding to a first scattering element are modified based on the target adjustment status of a corresponding adjustable component to generate the modified model, the predicted reflection signature corresponding to the first scattering element is removed from the aggregated predicted reflection signature and a modified predicted reflection signature, generated based on the modified parameters of the first scattering element, is appropriately phase-tuned and added to the aggregated predicted reflection signature to determine the modified aggregated predicted reflection signature. For example, if a second scattering element is removed from the model trained to define a scattering element representation of the radar target to generate the modified model, the predicted reflection signature corresponding to the second scattering element is removed from the aggregated predicted reflection signature to determine the modified aggregated predicted reflection signature. In another example, if a third scattering element is added to the model trained to define a scattering element representation of the radar target to generate the modified model, the predicted reflection signature corresponding to the third scattering element is appropriately phase-tuned and added to the aggregated predicted reflection signature to determine the modified aggregated predicted reflection signature.

In an example embodiment, step/operation 812 is a sub-step/operation of step/operation 810 and/or occurs as part of step/operation 810. For example, the modified model may be generated prior to the aggregation of the predicted reflection signature, such that the aggregated predicted reflection signature generated through the aggregation process of step/operation 810 is the modified aggregated predicted reflection signature.

At step/operation 814, the computational circuitry causes the radar cloaking apparatus to generate, transmit, broadcast, and/or emit a cloaking radio signal. For example, the computational circuitry causes the emitting antenna (e.g., via emitting circuitry 545, 645L, 645R) to generate, transmit, broadcast, and/or emit the cloaking radio signal. In various embodiments, a conditioned electronic signal is generated by the emitting circuitry (e.g., 545, 645R, 645L) of the radar cloaking apparatus responsive to processing of an interrogating radar signal by the receiving circuitry (e.g., 540, 640R, 640L) under the control of and/or based on input provided by the computational circuitry of the radar cloaking apparatus. In other words, the emitting circuitry conditions an electronic signal generated by the interrogating signal being incident on the receiving antenna and processed to extract information therefrom by the receiving circuitry. The emitting circuitry conditions the electronic signal based on control signals provided to one or more components of the emitting circuitry by the computational circuitry.

For example, in an example embodiment, the computational circuitry is configured to provide input to and/or control the operation of one or more components of the emitting circuitry (e.g., delay elements, 534, 634LL, 634LR, 634RL, 634RR, amplifiers 536, 636LL, 636LR, 636RL, 636RR, and/or the like) to condition an electronic signal generated by the receiving antenna and the receiving circuitry responsive to the interrogating radar signal being incident on the receiving antenna. The computational circuitry provides input and/or control of operation of the one or more components of the emitting circuitry such that the conditioned electrical signal causes the emitting antenna of to generate, transmit, broadcast, and/or emit a cloaking radio signal that is the (aggregated) predicted reflection signature (which is configured to approximate the reflected signal) shifted in phase by 120-240 degrees, 135-225 degrees, 150-210 degrees, 170-190 degrees, 175-185 degrees, and/or approximately 180 degrees out of phase with respect to the reflected signal generated by the interrogating radar signal scattering and/or reflecting off of the radar target, in an example embodiment.

The conditioned electronic signal is then provided to the emitting antenna such that the (aggregated) predicted reflection signature (or modified (aggregated) predicted reflection signature) is generated, transmitted, broadcasted, and/or emitted by the emitting antenna of the radar cloaking apparatus shifted in phase by 120-240 degrees, 135-225 degrees, 150-210 degrees, 170-190 degrees, 175-185 degrees, and/or approximately 180 degrees out of phase with the reflected signal generated by the interrogating radar signal scattering and/or reflecting off of the radar target. Thus, in an example embodiment, the radar cloaking apparatus may generate, transmit, broadcast, and/or emit a cloaking radio signal that is generated by generating an electrical signal by an interrogating radar signal being incident on a receiving antenna of the radar cloaking apparatus, conditioning the electronic signal based at least in part on a (aggregated) predicted reflection signature determined based on a model encoding scattering properties of a radar target (e.g., a model trained to define a scattering element representation of the radar target), and providing the conditioned electrical signal to an emitting antenna that generates, transmits, broadcasts, and/or emits the cloaking radio signal in response to receiving the conditioned electrical signal.

In various embodiments, the cloaking radio signal is the (aggregated) predicted reflection signature (or modified (aggregated) predicted reflection signature) that has been shifted in phase such that the (aggregated) predicted reflection signature (or modified (aggregated) predicted reflection signature) is transmitted and/or broadcast (e.g., by the transmitting and/or emitting antenna of the radar cloaking apparatus) shifted in phase by 120-240 degrees, 135-225 degrees, 150-210 degrees, 170-190 degrees, 175-185 degrees, and/or approximately 180 degrees out of phase with respect to the reflected signal generated by the interrogating radar signal scattering off of the radar target. For example, the (aggregated) predicted reflection signature (or modified (aggregated) predicted reflection signature) is an approximation of the reflected signal generated by the interrogating radar signal being incident on the radar target at the interrogation angle and scattering and/or reflecting off of the radar target, in an example embodiment.

The cloaking radio signal is transmitted and/or broadcast at least back toward the radar system that transmitted and/or broadcasted the interrogating radar signal (based on the determined interrogation angle and/or determined viewing angle) such that the cloaking radio signal destructively interferes with the reflected signal and reduces and/or minimizes the reflected signal observed by the radar system that transmitted and/or broadcasted the interrogating radar signal. In various embodiments, the amplitude and/or power of the reflected signal observed by the radar system that transmitted and/or broadcasted the interrogating radar signal (which is the sum of the cloaking radio signal and the reflected signal) is rendered approximately zero and/or below the detection threshold of the radar system.

In an example embodiment, the radar cloaking apparatus begins generating, transmitting, broadcasting, and/or emitting the cloaking radio signal prior to a full waveform (e.g., a portion of the wave corresponding to one wavelength) of the reflected signal being generated. For example, the interrogating radar signal is incident on the radar target at a time $t_0$. At the moment the interrogating radar signal is incident on the radar target (e.g., at time $t_0$), scattering and/or reflecting of the interrogating radar signal off of the radar target will occur and the reflected signal will begin to be generated. At time $t_0$, when the reflected signal begins to be generated, the reflected signal has an original phase $\varphi_0$ (e.g., dependent on the phase of the interrogating radar signal when the interrogating radar signal was incident on the radar target and the scattering properties of the radar target and/or scattering features thereof). In an example embodiment, the generating, transmitting, broadcasting, and/or emitting of the cloaking radio signal begins at time $t_1$. At time $t_1$, the reflected signal has a phase $\varphi_1 = \varphi_0 + \Delta\varphi$. As should be understood, $\Delta\varphi$ is a function of the time elapsed between $t_0$ and $t_1$ (e.g., $t_1 - t_0$) as well as, possibly, other factors (e.g., the frequency of the interrogating radar signal and/or the reflected signal, and/or the like). In various embodiments, $\Delta\varphi$ is less than 360 degrees. In various embodiments, $\Delta\varphi$ is in the range of 120-240 degrees (e.g., 120-240 degrees, 135-225 degrees, 150-210 degrees, 170-190 degrees, and/or 175-185 degrees, according to various embodiments). For example, in an example embodiment, $\Delta\varphi$ is approximately 180 degrees.

For example, the radar cloaking apparatus may begin and/or initiate generating, transmitting, broadcasting, and/or emitting the cloaking radio signal in dynamic time with respect to the interrogating radar signal being detected. For example, a radar cloaking apparatus may be configured to, responsive to detecting an interrogating radar signal, generate and begin transmitting and/or broadcasting a cloaking signal at a particular point in the phase of the reflected signal generated by the interrogating radar signal scattering and/or reflecting off of the radar target. For example, in an example embodiment, the particular point in the phase of the reflected signal is defined when the reflected signal is halfway through one waveform. In other words, the particular point in the phase of the reflected signal is the first time the reflected signal reaches a phase difference of 180 degrees with respect to the original phase of the reflected signal (e.g., when $\Delta\varphi$ is 180 degrees).

As described above, the predicted reflection signature for the radar target and/or a scattering element of the model trained to define a scattering element representation of the radar target is determined and/or computed (e.g. by the computational circuitry) by using scattering theory to predict how an interrogating radar signal at a particular frequency and/or frequency profile/spectrum would scatter and/or reflect off of the radar target and/or a scattering feature corresponding to the scattering element of the model. The particular frequency and/or frequency profile/spectrum is determined, identified, and/or selected based on the frequency information extracted from the electrical signal generated by the interrogating radar signal being incident on the receiving antenna. In an example embodiment, the problem is addressed as a direct scattering problem. In an example embodiment, only the backscattering components of the scattering of the interrogating radar signal off of the radar target and/or a scattering feature described by a corresponding scattering element are considered. For example, in an example embodiment, scattering of power and/or radio waves of the interrogating radar signal out of the line of sight of the radar system that transmitted and/or broadcasted the interrogating radar signal is not considered.

The predicted reflection signature for the radar target and/or a scattering element of the model trained to define a scattering element representation of the radar target is further determined and/or computed by scaling the scattering theory result using the voltage and/or amplitude information extracted from the electronic signal generated by the interrogating radar signal being incident on the receiving antenna. For example, the predicted reflection signature may be scaled (e.g., by the computational circuitry) based on the voltage and/or amplitude information extracted from the electronic signal to comprise an amount of power and/or to have an amplitude that approximates the expected amount of power in and/or amplitude of the reflected signal generated by the interrogating radar signal scattering and/or reflecting off of the radar target.

As noted above, the predicted reflection signatures corresponding to scattering elements of the model trained to define a scattering element representation of the radar target may be phased-tuned such that the relative phases of the predicted reflection signatures match and/or approximate those of the reflected signals generated by the interrogating radar signal scattering and/or reflecting off of scattering features of the radar target. The relative phase differences between the predicted reflection signatures is determined, at least in part, based on the relative locations of the scattering elements.

FIGS. 9, 10, and 11 illustrate how a predicted reflection signature may be phase-tuned based on the relative locations of the scattering feature corresponding to the respective scattering element of the model trained to define a scattering element representation of the radar target, the receiving antenna, and the emitting antenna. FIG. 9 illustrates the phase tuning of a predicted reflection signature for a scattering element corresponding to a scattering feature S having a relative position that, based on the determined interrogation angle, is behind both the receiving antenna RX and the emitting antenna TX. For example, the interrogating radar signal is incident on both the receiving antenna and the emitting antenna before the interrogating radar signal is incident on the scattering feature corresponding to the scattering element. In this example, the phase difference of the interrogating radar signal incident on the emitting antenna and the interrogating radar signal incident on the receiving antenna $\Delta\varphi_{RT}$ is 115 degrees and the phase difference of the interrogating radar signal incident on the receiving antenna and the interrogating radar signal incident on the scattering feature corresponding to the scattering element $\Delta\varphi_{SR}$ is 60 degrees. These phase differences are due to the relative locations of the scattering feature, receiving antenna, and/or the emitting antenna; the interrogation angle; the frequency of interrogating radar signal; and/or the like. In an example embodiment, the phase differences due to the relative locations of the scattering feature, receiving antenna, and/or emitting antenna are determined at least in part based on the determined roll and/or pitch angle of the radar target at the time the interrogating radar signal is incident on the radar target and the interrogation angle.

Line 910 shows an interrogating radar signal I emitted by a radar system 110, line 920 shows a reflected signal R generated by the interrogating radar signal I scattering and/or reflecting off of the scattering feature S, and line 930 shows a cloaking radio signal T generated by the radar cloaking apparatus based on the predicted reflection signature for the scattering element corresponding to the scattering feature S. When the interrogating radar signal I is incident on the receiving antenna RX, the interrogating radar signal I has a phase $I_{RX}$. The phase $I_{RX}$ is observable to the radar cloaking apparatus (e.g., the computational circuitry) as the phase information extracted from the electronic signal (e.g., by the receiving circuitry) generated by the interrogating radar signal being incident on the receiving antenna.

When the reflected signal generated by the interrogating radar signal I scattering and/or reflecting off of the scattering feature S passes the emitting antenna TX en route back to the radar system 110, the reflected signal has a phase $S_T = I_{Rx} - \Delta\varphi_{SR} - 180° - (\Delta\varphi_{SR} + \Delta\varphi_{RT})$ (mod 360°), where the 180 degree factor is introduced by the reflecting of the interrogating radar signal off of the scattering feature S. The cloaking radio signal corresponding to the predicted reflection signature generated based on the scattering element corresponding to the scattering feature S and transmitted and/or broadcasted by the emitting antenna TX should therefore have phase $T_S = S_T + 180° = I_{Rx} - \Delta\varphi_{SR} - (\Delta\varphi_{SR} + \Delta\varphi_{RT})$ (mod 360°) to be shifted in phase by 180 degrees with respect to the reflected signal. The electronic signal generated by the interrogating radar signal being incident on the receiving antenna RX may be conditioned, at least in part, by delaying and/or have a delay introduced therein amounting to a phase difference of $-\Delta\varphi_{SR} - (\Delta\varphi_{SR} + \Delta\varphi_{RT})$ and then provided to the emitting antenna TX.

In various embodiments, as described above, the electronic signal may also be conditioned such that the amplitude of the conditioned electronic signal causes the transmission and/or broadcasting of a cloaking radio signal that has an amplitude in accordance with the predicted reflection signature of the scattering element corresponding to the scattering feature S. For example, the amplitude of the electronic signal may be conditioned such that the resulting cloaking radio signal portion corresponding to the scattering element corresponding to the scattering feature S has the same amplitude as the predicted reflection signature generated based on the scattering element corresponding to the scattering feature S. For example, the amplitude of the electronic signal may be conditioned such that the amplitude of the resulting cloaking radio signal portion corresponding to the scattering element corresponding to the scattering feature S approximates the amplitude of the reflected signal generated by the interrogating radar signal scattering and/or reflecting off of the scattering feature S.

FIG. 10 illustrates the phase tuning of a predicted reflection signature for a scattering element corresponding to a scattering feature S having a relative position that, based on the determined interrogation angle, is between the receiving antenna RX and the emitting antenna TX. For example, the interrogating radar signal is incident on the emitting antenna TX first, the scattering feature S second, and the receiving antenna RX third. In this example, the phase difference of the interrogating radar signal incident on the emitting antenna and the interrogating radar signal incident on the scattering feature S $\Delta\varphi_{ST}$ is 115 degrees and the phase difference of the interrogating radar signal incident on the scattering feature S and the interrogating radar signal incident on the receiving antenna corresponding to the scattering element $\Delta\varphi_{RS}$ is 60 degrees. These phase differences are due to the relative locations of the scattering feature, receiving antenna, and/or the emitting antenna; the interrogation angle; the frequency of interrogating radar signal; and/or the like. In an example embodiment, the phase differences due to the relative locations of the scattering feature, receiving antenna, and/or emitting antenna are determined at least in part based on the determined roll and/or pitch angle of the radar target at the time the interrogating radar signal is incident on the radar target and the interrogation angle.

Line 1010 shows an interrogating radar signal I emitted by a radar system 110, line 1020 shows a reflected signal R generated by the interrogating radar signal I scattering and/or reflecting off of the scattering feature S, and line 1030 shows a cloaking radio signal T generated by the radar cloaking apparatus based on the predicted reflection signature for the scattering element corresponding to the scattering feature S. When the interrogating radar signal I is incident on the receiving antenna RX, the interrogating radar signal I has a phase $I_{RX}$. The phase $I_{RX}$ is observable to the radar cloaking apparatus (e.g., the computational circuitry) as the phase information extracted from the electronic signal (e.g., by the receiving circuitry) generated by the interrogating radar signal being incident on the receiving antenna.

When the reflected signal generated by the interrogating radar signal I scattering and/or reflecting off of the scattering feature S passes the emitting antenna TX en route back to the radar system 110, the reflected signal has a phase $S_T = I_{Rx} + \Delta\varphi_{RS} - 180° \times \Delta\varphi_{ST}$ (mod 360°), where the 180 degree factor is introduced by the reflecting of the interrogating radar signal off of the scattering feature S. The cloaking radio signal corresponding to the predicted reflection signature generated based on the scattering element corresponding to the scattering feature S and transmitted and/or broadcasted by the emitting antenna TX should therefore have phase $T_S = S_T + 180° = I_{Rx} + \Delta\varphi_{RS} - \Delta\varphi_{ST}$ (mod 360°) to be shifted in phase by 180 degrees with respect to the reflected signal. The electronic signal generated by the interrogating radar signal being incident on the receiving antenna RX may be conditioned, at least in part, by delaying and/or have a delay introduced therein amounting to a phase difference of $\Delta\varphi_{RS} - \Delta\varphi_{ST}$ and then provided to the emitting antenna TX. As described above, in various embodiments, the electronic signal may also be conditioned such that the amplitude of the electronic signal causes the transmission and/or broadcasting of a cloaking radio signal that has an amplitude in accordance with the predicted reflection signature of the scattering element corresponding to the scattering feature S that approximates the amplitude of the reflected signal generated by the interrogating radar signal scattering and/or reflecting off of the scattering feature S.

FIG. 11 illustrates the phase tuning of a predicted reflection signature for a scattering element corresponding to a scattering feature S having a relative position that, based on the determined interrogation angle, is in front of both the receiving antenna RX and the emitting antenna TX. For example, the interrogating radar signal is incident on the scattering feature S first, the emitting antenna TX second, and the receiving antenna RX third. In this example, the phase difference of the interrogating radar signal incident on the scattering feature S and the interrogating radar signal incident on the emitting antenna TX $\Delta\varphi_{ST}$ is 115 degrees and the phase difference of the interrogating radar signal incident on the emitting antenna TX and the interrogating radar signal incident on the receiving antenna RX is $\Delta\varphi_{TR}$ is 60 degrees. These phase differences are due to the relative locations of the scattering feature, receiving antenna, and/or the emitting antenna; the interrogation angle; the frequency of interrogating radar signal; and/or the like. In an example embodiment, the phase differences due to the relative locations of the scattering feature, receiving antenna, and/or emitting antenna are determined at least in part based on the determined roll and/or pitch angle of the radar target at the time the interrogating radar signal is incident on the radar target and the interrogation angle.

Line 1110 shows an interrogating radar signal I emitted by a radar system 110, line 1120 shows a reflected signal R generated by the interrogating radar signal I scattering and/or reflecting off of the scattering feature S, and line 1130 shows a cloaking radio signal T generated by the radar cloaking apparatus based on the element predicted reflection signature for the scattering element corresponding to the scattering feature S. When the interrogating radar signal I is incident on the receiving antenna RX, the interrogating radar signal I has a phase $I_{RX}$. The phase $I_{RX}$ is observable to the radar cloaking apparatus (e.g., the computational circuitry) as the phase information extracted from the electronic signal (e.g., by the receiving circuitry) generated by the interrogating radar signal being incident on the receiving antenna.

If the reflected signal generated by the interrogating radar signal scattering and/or reflecting off of the scattering feature S were to continue backward to the emitting antenna TX, the reflected signal would have a phase of $S_T = I_{RX} - 180° + (\varphi_{ST} + \varphi_{TR}) + \varphi_{TR}$ (mod 360°) at the point of the emitting antenna TX, where the 180 degree factor is introduced by the reflecting of the interrogating radar signal off of the scattering feature S. The cloaking radio signal corresponding to the element predicted reflection signature generated based on the scattering element corresponding to the scattering feature S and transmitted and/or broadcasted by the emitting antenna TX should therefore have phase $T_S = S_T + 180° = I_{Rx} + (\varphi_{ST} + \varphi_{TR} + \varphi_{ST})$ (mod) 360° to be shifted in phase by 180 degrees with respect to the reflected signal. The electronic signal generated by the interrogating radar signal being incident on the receiving antenna RX may be conditioned, at least in part, by delaying and/or have a delay introduced therein amounting to a phase difference of $(\Delta\varphi_{ST} + \Delta\varphi_{TR}) + \Delta\varphi_{ST}$ and then provided to the emitting antenna TX. In various embodiments, the electronic signal may also be conditioned such that the amplitude of the electronic signal causes the transmission and/or broadcasting of a cloaking radio signal that has an amplitude in accordance with the predicted reflection signature of the scattering element corresponding to the scattering feature S that approximates the amplitude of the reflected signal generated by the interrogating radar signal scattering and/or reflecting off of the scattering feature S.

Technical Advantages

Various embodiments described herein provide an active radar cloaking technique and a radar cloaking apparatus configured to perform active radar cloaking. Moreover, the active radar cloaking techniques described herein provide for the generation, transmission, broadcasting, and/or emission of a cloaking radio signal in dynamic time with respect to the detection of an interrogating radar signal. The time and computational efficiency with which the cloaking radio signal may be generated, transmitted, broadcasted, and/or emitted is, in some embodiments, due to the use of a model trained to define a scattering element representation of the radar target as the model encoding scattering properties of the radar target. This enables the determination of an aggregated predicted reflection signature using a discrete set of point-like scattering elements rather than attempting to compute the predicted reflection signature of a two dimensional surface. The (aggregated) predicted reflection signature may therefore be computed for a variety of interrogation angles more quickly and with less computational power, thereby enabling the cloaking radio signal to be generated, transmitted, broadcasted, and/or emitted in dynamic time with respect to the interrogating radar signal being incident on the radar target.

In various embodiments, the radar cloaking apparatus is configured to condition an electronic signal generated responsive to an interrogating radar signal being incident on a receiving antenna of the radar cloaking apparatus based at least in part on the predicted reflection signature to generate a conditioned electronic signal. This conditioned electronic signal is provided to an emitting antenna to cause the cloaking radio signal to be generated, transmitted, and/or broadcasted. Thus, the cloaking radio signal is generated using a conditioned portion of the interrogating radar signal itself. The conditioning of the electronic signal includes delaying the signal to adjust the phase and/or adjusting the amplitude, timing, and/or polarization attributes of the interrogating radar signal to mimic the reflecting and/or scattering of the interrogating radar signal off of the radar target. For example, a cycle of the emitted cloaking radio signal is generated using a delayed version of an earlier cycle of the interrogating radar signal. Such features enable various embodiments to effectively reduce the signal received by a radar system to have an amplitude below a radar detection threshold through destructive interference of the reflected signal and the cloaking radio signal.

Moreover, various embodiments described herein may be used to perform radar cloaking of radar targets for which passive radar cloaking techniques (e.g., use of radar-absorbing materials, use of metamaterials, and/or radar target geometry) are not appropriate and/or feasible. Additionally, such passive radar cloaking techniques are not effective at lower radar frequencies (e.g., less than 4-10 GHz). Various embodiments further provide for performing radar cloaking at radar frequencies for which passive radar cloaking techniques are not feasible and/or possible (e.g., radar frequencies less than 4-10 GHz). For example, at lower radar frequencies, the wavelength of an interrogating radar signal is longer, and thus is harder to absorb and/or deflect. However, the active cloaking provided by various embodiments may be effectively used to provide radar cloaking against interrogating radar signals operating at lower radar frequencies, such as HF-, VHF-, UHF-, L-, and/or S-bands. Thus, various embodiments provide technical improvements to radar cloaking technology by extending the frequency range at which radar cloaking may be effectively performed.

Additionally, various embodiments provide technical solutions to the technical problem of determining the scattering properties of a radar target at a particular moment in time (e.g., the time when the interrogating radar signal is being incident on the radar target). Due to moveable components of the radar target, changes in the roll and/or pitch angle of the radar target, and/or the like, determining the scattering properties of the radar target quickly enough to provide an effective cloaking radio signal in dynamic time is very challenging. Various embodiments of the present disclosure address this challenge through the use of a model that enables efficient determination of a target adjustment status such that the scattering element representation of the radar target can quickly and accurately be modified to account for the current target adjustment status (e.g., the current geometry and scattering properties) of the radar target.

A further technical problem for which technical solutions are provided by various embodiments is defining the non-trivial transfer function between the transmitting/emitting antenna and the receiving antenna due to bistatic scattering of the interrogating radar signal off of the radar target. In various embodiments, the model used to determine the predicted reflection signature of the radar target may be configured to include the inverse of this transfer function in order to achieve effective cancellation and/or reduction in amplitude of the reflected signal observed by an interrogating radar system. In various embodiments, the inverse of the transfer function is built into the model encoding the scattering properties of the radar target based on the relative locations of various scattering elements, for example, with respect to the emitting antenna and/or receiving antenna.

Moreover, example embodiments provide technical solutions to the technical problem of determining the interrogation angle such that a viewing angle for the interrogating radar signal may be determined. The viewing angle is used to determine the predicted reflection signature corresponding to the expected reflection signal generated by the interrogating radar signal reflecting and/or scattering off of the radar target from the orientation indicated by and/or corresponding to the viewing angle.

Thus, various embodiments provide inventive technical solutions to a variety of technical problems corresponding to radar cloaking, radar cloaking at lower frequencies (e.g., less than 4-10 GHz), and/or active radar cloaking.

CONCLUSION

Many modifications and other embodiments of the disclosure set forth herein will come to mind to one skilled in the art to which this disclosure pertains having the benefit of the teachings presented in the foregoing descriptions and the associated drawings. Therefore, it is to be understood that the claims are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A radar cloaking apparatus configured for positioning on a radar target defining one or more scattering features, the radar cloaking apparatus comprising:
   a first polarization channel receiving antenna configured to generate a first channel electrical signal in response to an interrogation signal being incident thereon;
   a second polarization channel receiving antenna configured to generate a second channel electrical signal in response to the interrogation signal being incident thereon;
   first polarization receiving circuitry configured to process the first channel electrical signal to generate a first channel extracted information signal;
   second polarization receiving circuitry configured to process the second channel electrical signal to generate a second channel extracted information signal;
   first polarization emitting circuitry configured to process a first portion of the first channel extracted information signal and a first portion of the second channel extracted information signal to generate a first channel emission signal;
   second polarization emitting circuitry configured to process a second portion of the first channel extracted information signal and a second portion of the second channel extracted information signal to generate a second channel emission signal;
   a first polarization channel emitting antenna configured to transmit a first channel cloaking radio signal based on the first channel emission signal; and a second polarization channel emitting antenna configured to transmit a second channel cloaking radio signal based on the second channel emission signal.

2. The radar cloaking apparatus of claim 1, wherein the first channel cloaking radio signal is characterized by a first polarization and the second channel cloaking radio signal is characterized by a second polarization, wherein the first polarization and second polarization are different from one another.

3. The radar cloaking apparatus of claim 2, wherein the first polarization is a right-hand polarization, and the second polarization is a left-hand polarization.

4. The radar cloaking apparatus of claim 2, wherein the first polarization channel receiving antenna is configured to generate the first channel electrical signal based on a portion of the interrogation signal characterized by the first polarization and the second polarization channel receiving antenna is configured to generate the second channel electrical signal based on a portion of the interrogation signal characterized by the second polarization.

5. The radar cloaking apparatus of claim 2, wherein at least a portion of the first channel cloaking radio signal is generated based on the second channel extracted information signal and at least a portion of the second channel cloaking radio signal is generated based on the first channel extracted information signal.

6. The radar cloaking apparatus of claim 1, wherein the first channel emission signal and the second channel emission signal are generated based at least in part on a predicted reflection signature of the radar target determined based at least in part on a model encoding scattering properties of the radar target.

7. The radar cloaking apparatus of claim 6, wherein the predicted reflection signature of the radar target is generated by aggregating respective predicted reflection signatures of a plurality of scattering elements of the radar target together based at least in part on respective phase delays of the respective predicted reflection signatures, each of the respective phase delays and each of the respective predicted reflection signatures correspond to a respective scattering element of the plurality of scattering elements.

8. The radar cloaking apparatus of claim 7, wherein each of the respective phase delays is determined based on a combination of (a) a frequency profile of the interrogation signal and (b) relative positions of (i) the respective scattering element, (ii) at least one of the first polarization channel receiving antenna or the second polarization channel receiving antenna (iii) at least one of the first polarization channel emitting antenna or the second polarization channel emitting antenna.

9. The radar cloaking apparatus of claim 1, wherein the first polarization emitting circuitry comprises at least one first delay element configured to introduce a first delay between the first portion of the first channel extracted information signal and the first portion of the second channel extracted information signal and the second polarization emitting circuitry comprises at least one second delay element configured to introduce a second delay between the second portion of the first channel extracted information signal and the second portion of the second channel extracted information signal.

10. The radar cloaking apparatus of claim 1, wherein the first channel cloaking radio signal and the second channel cloaking radio signal are actively generated in dynamic time with respect to detecting the interrogation signal.

11. The radar cloaking apparatus of claim 10, wherein the first channel emission signal and the second channel emission signal are generated based at least in part on a predicted reflection signature of the radar target determined based at least in part on a model encoding scattering properties of the radar target that is modified based at least in part on a respective status of one or more adjustable components of the radar target.

12. The radar cloaking apparatus of claim 1, wherein a superposition of the first channel cloaking radio signal, the second channel cloaking radio signal, and a reflected signal generated by the interrogation signal scattering off of the radar target is a minimized signal having an amplitude that is less than the reflected signal.

13. A method performed by a radar cloaking apparatus configured for positioning on a radar target defining one or more scattering features, the method comprising:
    generating, by a first polarization channel receiving antenna of the radar cloaking apparatus, a first channel electrical signal in response to an interrogation signal being incident on the first polarization channel receiving antenna;
    generating, by a second polarization channel receiving antenna of the radar cloaking apparatus, a second channel electrical signal in response to the interrogation signal being incident on the second polarization channel receiving antenna;
    processing, by first polarization receiving circuitry of the radar cloaking apparatus, the first channel electrical signal to generate a first channel extracted information signal;
    processing, by second polarization receiving circuitry of the radar cloaking apparatus, the second channel electrical signal to generate a second channel extracted information signal;
    generating, by first polarization emitting circuitry of the radar cloaking apparatus, a first channel emission signal based at least in part on processing a first portion of the first channel extracted information signal and a first portion of the second channel extracted information signal;
    generating, by second polarization emitting circuitry of the radar cloaking apparatus, a second channel emission signal based at least in part on processing a second portion of the first channel extracted information signal and a second portion of the second channel extracted information signal;
    transmitting, by a first polarization channel emitting antenna of the radar cloaking apparatus, a first channel cloaking radio signal based on the first channel emission signal; and
    transmitting, by a second polarization channel emitting antenna of the radar cloaking apparatus, a second channel cloaking radio signal based on the second channel emission signal.

14. The method of claim 13, wherein the first channel cloaking radio signal is characterized by a first polarization and the second channel cloaking radio signal is characterized by a second polarization, wherein the first polarization and second polarization are different from one another.

15. The method of claim 14, wherein the first polarization channel receiving antenna is configured to generate the first channel electrical signal based on a portion of the interrogation signal characterized by the first polarization and the second polarization channel receiving antenna is configured to generate the second channel electrical signal based on a portion of the interrogation signal characterized by the second polarization.

16. The method of claim 13, wherein the first channel emission signal and the second channel emission signal are generated based at least in part on a predicted reflection signature of the radar target determined based at least in part on a model encoding scattering properties of the radar target.

17. The method of claim 16, wherein the predicted reflection signature of the radar target is generated by aggregating respective predicted reflection signatures of a plurality of scattering elements of the radar target together based at least in part on respective phase delays of the respective predicted reflection signatures, each of the respective phase delays and each of the respective predicted reflection signatures correspond to a respective scattering element of the plurality of scattering elements.

18. The method of claim 13, wherein the first polarization emitting circuitry comprises at least one first delay element configured to introduce a first delay between the first portion of the first channel extracted information signal and the first portion of the second channel extracted information signal and the second polarization emitting circuitry comprises at least one second delay element configured to introduce a second delay between the second portion of the first channel extracted information signal and the second portion of the second channel extracted information signal.

19. The method of claim 13, wherein the first channel cloaking radio signal and the second channel cloaking radio signal are actively generated in dynamic time with respect to detecting the interrogation signal.

20. The method of claim 19, wherein the first channel emission signal and the second channel emission signal are generated based at least in part on a predicted reflection signature of the radar target determined based at least in part on a model encoding scattering properties of the radar target that is modified based at least in part on a respective status of one or more adjustable components of the radar target.

* * * * *